(12) United States Patent
Ren et al.

(10) Patent No.: US 10,530,450 B2
(45) Date of Patent: Jan. 7, 2020

(54) MULTI-ANTENNA CHANNEL MEASUREMENT METHOD AND APPARATUS

(71) Applicant: HUAWEI TECHNOLOGIES CO., LTD., Shenzhen (CN)

(72) Inventors: Haibao Ren, Shanghai (CN); Yuanjie Li, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/935,035

(22) Filed: Mar. 25, 2018

(65) Prior Publication Data

US 2018/0212662 A1    Jul. 26, 2018

Related U.S. Application Data

(63) Continuation of application No. PCT/CN2016/100134, filed on Sep. 26, 2016.

(30) Foreign Application Priority Data

Sep. 25, 2015  (CN) .......................... 2015 1 0623199

(51) Int. Cl.
    *H04B 7/06* (2006.01)
    *H04L 1/06* (2006.01)
    (Continued)

(52) U.S. Cl.
    CPC ......... *H04B 7/0626* (2013.01); *H04B 7/0469* (2013.01); *H04B 7/0478* (2013.01);
    (Continued)

(58) Field of Classification Search
    CPC ........ H04B 7/06; H04W 24/10; H04W 76/27; H04L 5/0048
    See application file for complete search history.

(56) References Cited

U.S. PATENT DOCUMENTS

| 2014/0079100 A1 | 3/2014 | Kim et al. |
| 2014/0221038 A1* | 8/2014 | Nakashima ......... H04W 52/242 |
| | | 455/522 |

(Continued)

FOREIGN PATENT DOCUMENTS

| CN | 103840868 A | 6/2014 |
| CN | 104662812 A | 5/2015 |

(Continued)

OTHER PUBLICATIONS

R1-151285 Huawei, HiSilicon,"Codebook enhancements for EBF/FD-MIMO",3GPP TSG RAN WG1 Meeting #80bis, Belgrade, Serbia, Apr. 20-24, 2015,total 4 pages.

(Continued)

*Primary Examiner* — Chi Ho A Lee
(74) *Attorney, Agent, or Firm* — Kilpatrick Townsend & Stockton LLP

(57) ABSTRACT

A multi-antenna channel measurement method is provided, where: a base station sends a first channel state information-reference signal (CSI-RS) and a second CSI-RS to the terminal, and the first CSI-RS and the second CSI-RS are separately sent by using antenna elements in orthogonal dimensions; the base station receives a first CSI measurement result for the first CSI-RS and the second CSI-RS and that is fed back by the terminal; and the base station sends a third CSI-RS to the terminal according to the first CSI measurement result, and the third CSI-RS has been precoded according to the first CSI measurement result; and the base station receives a third CSI measurement result that is for the third CSI-RS and that is fed back by the terminal. Therefore, reducing calculation complexity on a terminal side of channel measurement and reducing a resource occupied for channel measurement and feedback in a multi-antenna port.

20 Claims, 9 Drawing Sheets

(51) Int. Cl.
*H04W 76/27* (2018.01)
*H04L 5/00* (2006.01)
*H04W 24/10* (2009.01)
*H04B 7/0456* (2017.01)

(52) U.S. Cl.
CPC ............... *H04B 7/06* (2013.01); *H04B 7/065* (2013.01); *H04B 7/0634* (2013.01); *H04B 7/0639* (2013.01); *H04L 1/06* (2013.01); *H04L 5/0048* (2013.01); *H04W 24/10* (2013.01); *H04W 76/27* (2018.02)

(56) References Cited

U.S. PATENT DOCUMENTS

| | | | |
|---|---|---|---|
| 2014/0301492 | A1 | 10/2014 | Xin et al. |
| 2015/0288497 | A1 | 10/2015 | Li et al. |
| 2015/0318909 | A1 | 11/2015 | Zhang et al. |
| 2016/0173244 | A1 | 6/2016 | Ding |
| 2016/0323021 | A1* | 11/2016 | Chen .................... H04B 7/0413 |
| 2016/0344458 | A1* | 11/2016 | Zhao ..................... H04L 1/16 |
| 2017/0279504 | A1* | 9/2017 | Chen .................... H04B 7/0421 |
| 2017/0331535 | A1* | 11/2017 | Wei ...................... H04B 7/0469 |
| 2017/0353222 | A1* | 12/2017 | Wei ...................... H04B 7/0469 |
| 2018/0041973 | A1* | 2/2018 | Faxer ................... H04B 7/0617 |
| 2018/0062715 | A1* | 3/2018 | Li ......................... H04B 7/04 |
| 2018/0083681 | A1* | 3/2018 | Faxer ................... H04B 7/0413 |
| 2018/0123664 | A1* | 5/2018 | Li ......................... H04B 7/0413 |
| 2018/0219603 | A1* | 8/2018 | Park ..................... H04B 7/0626 |

FOREIGN PATENT DOCUMENTS

| | | |
|---|---|---|
| WO | 2013172692 A1 | 11/2013 |
| WO | 2014069821 A1 | 5/2014 |
| WO | 2014113992 A1 | 7/2014 |
| WO | 2014161145 A1 | 10/2014 |
| WO | 2015014321 A1 | 2/2015 |
| WO | 2015020464 A1 | 2/2015 |
| WO | 2015054895 A1 | 4/2015 |

OTHER PUBLICATIONS

R1-144594 Huawei, HiSilicon,"Potential enhancements with 2D antenna array",3GPP TSG RAN WG1 Meeting #79, San Francisco, USA, Nov. 17-21, 20.14,total 4 pages.

R1-151281 Huawei, HiSilicon,"Baseline scheme and performance evaluation for 16TXRU",3GPP TSG RAN WG1 Meeting #80bis,Belgrade, Serbia, Apr. 20-24, 2015,total 6 pages.

XP051001678 R1-154366 ITRI,"Evaluation Results of Codebook Proposals for FD-MIMO"; 3GPP TSG RAN WG1 Meeting #82, Beijing, China, Aug. 24-28, 2015, total 8 pages.

XP051294289 3GPP TR 36.897 V13.0.0 (Jun. 2015), 3rd Generation Partnership Project; Technical Specification Group Radio Access Network; Study on elevation beamforming / Full-Dimension (FD)Multiple Input Multiple Output (MIMO) for LTE(Release 13), total 58 pages.

Samsung, Configuration and control signailng for Rel.13 FD-MIMO, 3GPP TSG RAN WG1 Meeting #81 R1-153386, May 18, 2015 (publically available date), Internet URL: http://www.3gpp.org/ftp/tsg_ran/WG1_RL1/TSGR1_81/Docs/R1-153386.zip>, total 7 pages.

Fiberhome, Discussion CSI-Process Reporting class B for FD-MIMO, 3GPP TSG RAN WG1 Meeting #82bis R1-155696, Sep. 25, 2015 (publically available date), InternetURL: http://www.3gpp.org/ftp/tsg_ran/WG1_RL1/TSGR1_82b/Docs/R1-155696.zip>, total 4 pages.

\* cited by examiner

MULTI-ANTENNA CHANNEL MEASUREMENT METHOD AND APPARATUS

CROSS-REFERENCE TO RELATED APPLICATIONS

This application is a continuation of International Application No. PCT/CN2016/100134, filed on Sep. 26, 2016, which claims priority to Chinese Patent Application No. CN201510623199.8, filed on Sep. 25, 2015, The disclosures of the aforementioned applications are hereby incorporated by reference in their entireties.

TECHNICAL FIELD

The present invention relates to the field of communications technologies, and in particular, to a multi-antenna channel measurement method and an apparatus.

BACKGROUND

It can be learned, from analysis based on a conventional information theory, that a system capacity is determined by a signal-to-noise ratio of a receive end. Essentially, performing multiple access for a plurality of users is to divide or share the system capacity. In theory, TDMA, CDMA, or (O)FDMA cannot increase a capacity boundary of a system, and are merely different capacity division methods. Emergence of MIMO proves in theory that a system capacity may increase as a quantity of transmit/receive antennas increases, and therefore improves a theoretical boundary of the system. When an LTE system is designed, MIMO and OFDMA are used as basic physical layer technologies of the LTE system to maximize a system capacity. For detection performance improvement of a receiver, a transmitting end usually needs to precode a signal before sending, to reduce interference caused by signals from different antennas to a receiving antenna. In an FDD system, because channel reciprocity is unavailable, a precoding codebook used by a transmitting end needs to be obtained by means of feedback performed by a receive end. In an LTE protocol, UE generally indicates, by feeding back a PMI, an optimal codebook that is used by a BS on the UE.

In the base version (Release 8), LTE supports four transmit antennas on a base station side, and defines codebooks of the four antennas. A UE side needs to perform CSI calculation according to a cell-specific reference signal CRS. Because an antenna quantity is relatively small, and a codebook size is also relatively small, PMI calculation and feedback on the UE side are relatively simple. In LTE R10, a base station side may support a maximum of eight transmit antennas, and a CRS is supported by only four transmit ports, and is supported in each frame. If a CRS is supported by eight antenna ports, pilot overheads are excessively high. Therefore, a CSI-RS that is sent relatively sparsely and may be dynamically configured is introduced to perform CSI measurement and feedback when there are eight antennas. In this case, to reduce PMI calculation complexity on a UE side and a feedback amount, a codebook for the eight antennas uses a double codebook structure, that is, a codebook W of a system includes a first codebook $W_1$ and a second codebook $W_2$, that is, $W=W_1W_2$. The first codebook is a wide beam codebook, changes slowly, and has a relatively long UE feedback period. The second codebook is a quickly changing codebook (also referred to as a short-time codebook or a narrow beam codebook). A purpose of the second codebook is to match a frequency selection feature and a short time feature of a channel, and UE needs a relatively short codebook feedback period.

As an antenna quantity of a base station further increases, when a linear array of antennas becomes a two-dimensional planar array of antennas, a configuration of a single CSI-RS cannot support more antenna ports. Theoretically, for a CSI-RS of existing LTE, one resource block (RB) includes a maximum of 40 resource elements (Res). Therefore, 40 orthogonal antenna ports can be supported in theory by constantly increasing a quantity of ports for the CSI-RS. As an antenna quantity continues to increase, a current allocation method in which each antenna port occupies one orthogonal pilot CSI-RS and a method in which UE measures all antenna ports and feeds back an integral PMI are no longer suitable. Therefore, providing a proper channel measurement method under a trend of increasing antenna ports is an urgent problem that needs to be resolved.

SUMMARY

Embodiments of the present invention provide a multi-antenna channel measurement method, an apparatus, a communications system, and a terminal to be applied to channel measurement in a multi-antenna scenario.

A first aspect provides a multi-antenna channel measurement method. From a perspective of a first wireless network device, the method includes:

sending, by a first wireless network device, a first channel state information-reference signal (CSI-RS) and a second CSI-RS to a second wireless network device, where the first CSI-RS and the second CSI-RS are separately sent by using antenna elements in orthogonal dimensions;

receiving, by the first wireless network device, a first CSI measurement result for the first CSI-RS and the second CSI-RS and that is fed back by the second wireless network device;

sending, by the first wireless network device, a third CSI-RS to the second wireless network device according to the first CSI measurement result, where the third CSI-RS has been precoded according to the first CSI measurement result; and receiving, by the first wireless network device, a third CSI measurement result that is for the third CSI-RS and that is fed back by the second wireless network device.

From a perspective of the second wireless network device, the method includes:

receiving, by a second wireless network device, a first channel state information-reference signal (CSI-RS) and a second CSI-RS, and performing CSI measurement based on the first CSI-RS and the second CSI-RS, where the first CSI-RS and the second CSI-RS are separately sent by using antenna elements in orthogonal dimensions;

feeding back, by the second wireless network device, a first CSI measurement result for the first CSI-RS and the second CSI-RS to the first wireless network device;

receiving, by the second wireless network device, a third CSI-RS, where the third CSI-RS has been precoded according to the first CSI measurement result; and feeding back, by the second wireless network device, a third CSI measurement result for the third CSI-RS to the first wireless network device.

Optionally, the first wireless network device may be a base station, and the second wireless network device may be UE.

Optionally, the foregoing orthogonal dimensions may be a vertical direction (dimension) and a horizontal direction (dimension).

Optionally, the first CSI-RS and the second CSI-RS are configured by using radio resource control (RRC) signaling, and configurations of the first CSI-RS and the second CSI-RS are included in different CSI processes, or are in a same enhanced CSI process.

Optionally, the configurations of the first CSI-RS and/or the second CSI-RS include: a first indication, used to notify the second wireless network device that a currently sent CSI-RS is the first CSI-RS and/or the second CSI-RS, or is not the third CSI-RS; and/or a second indication, used to indicate that the first CSI-RS and/or the second CSI-RS are/is sent by using antenna elements in a same polarization direction, or the first CSI-RS and/or the second CSI-RS are/is sent by using antenna elements in two polarization directions.

Optionally, the third CSI-RS is configured by using the radio resource control (RRC) signaling, and the configuration includes a third indication, used to notify the second wireless network device that a currently sent CSI-RS is the third CSI-RS.

Optionally, the third CSI-RS is configured by using the radio resource control (RRC) signaling, and the configuration includes simultaneous configuration of a plurality of CSI-RS resources.

Optionally, the first wireless network device adds an indicator bit to the RRC configuration to notify the second wireless network device that the currently sent CSI-RS is the first CSI-RS or the second CSI-RS, or is not the third CSI-RS. In this way, when feeding back a precoding matrix indicator for the first CSI-RS or the second CSI-RS, the UE may feed back only an index of a wide beam codebook.

Optionally, the first CSI-RS and the second CSI-RS are sent omni-directionally.

Optionally, that the third CSI-RS has been precoded according to the first CSI measurement result includes:

the third CSI-RS has been beamformed according to the first CSI measurement result.

In this way, the base station may perform precoding on a third CSI-RS symbol according to the CSI measurement result fed back by the UE for the first CSI-RS and the second CSI-RS, so that the third CSI-RS is sent on the wide beam fed back by the UE. This may reduce a CSI measurement workload of the UE, and reduce complexity of calculating the CSI measurement result by the UE.

Optionally, the first CSI measurement result includes a first precoding matrix indicator (PMI) that is corresponding to a first codebook.

Optionally, the first CSI measurement result is corresponding to a wide beam codebook, and the wide beam codebook is used to represent selection of the wide beam.

Optionally, when the base station sends the first CSI-RS and/or the second CSI-RS by using antenna elements in two polarization directions, the wide beam codebook is a diagonal matrix ($W_1$) including two sub-matrices, and the two sub-matrices are respectively corresponding to selection of wide beams in the two polarization directions of the antenna elements.

Optionally, the two sub-matrices are different.

In this way, the UE can select different wide beams in the two polarization directions.

Optionally, the two sub-matrices are the same. That is, the UE can select a same wide beam in the two polarization directions to reduce a feedback amount of the CSI measurement result of the UE.

Optionally, the first codebook is a diagonal matrix ($W_1$) including two sub-matrices, and the two sub-matrices are respectively corresponding to the two polarization directions of antenna elements.

Optionally, each column of each sub-matrix in the wide beam codebook or in the first codebook is a column selected from a matrix $\overline{X}$, the column of each sub-matrix selected from the matrix $\overline{X}$ forms a wide beam in a same polarization direction of the antenna elements, an element in an $i^{th}$ row and a $j^{th}$ column of the matrix $\overline{X}$ is $$\overline{X_{i,j}} = e^{j\frac{2\pi(i-1)(j-1)}{K}},$$

$i \in \{1,2,\ldots,I\}$, $j \in \{1,2,\ldots,K\}$, where: if the first CSI measurement result is fed back for the first CSI-RS, I is a half of a quantity of ports for the first CSI-RS, or if the first CSI measurement result is fed back for the second CSI-RS, I is a half of a quantity of ports for the second CSI-RS; and K is a quantity of narrow beams supported by a system.

Optionally, when the base station sends the first CSI-RS and/or the second CSI-RS by using antenna elements in a same polarization direction, the wide beam codebook or the first codebook is an matrix that is corresponding to the same polarization direction of the antenna elements, each column of the matrix is a column selected from the matrix $\overline{X}$, the column of each sub-matrix selected from the matrix $\overline{X}$ forms a wide beam in the same polarization direction of the antenna elements, an element in an $i^{th}$ row and a $j^{th}$ column of the matrix $\overline{X}$ is $$\overline{X_{i,j}} = e^{j\frac{2\pi(i-1)(j-1)}{K}},$$

$i \in \{1,2,\ldots,I\}$, $j \in \{1,2,\ldots,K\}$, where: if the first CSI measurement result is fed back for the first CSI-RS, I is a quantity of ports for the first CSI-RS, or if the first CSI measurement result is fed back for the second CSI-RS, I is a quantity of ports for the second CSI-RS; and K is a quantity of narrow beams supported by a system.

Optionally, the first PMI includes a PMI 1 fed back for the first CSI-RS and a PMI 2 fed back for the second CSI-RS, and both the PMI 1 and the PMI 2 are corresponding to the first codebook (also referred to as a wide beam codebook).

Optionally, the PMI 1 and the PMI 2 are different.

Optionally, after being jointly encoded, the PMI 1 and the PMI 2 are fed back by using a part of a PMI, a resource occupied by the part of the PMI may be a resource occupied by a PMI to feed back the wide beam codebook in an existing protocol, thereby reducing a resource occupied by the UE to feed back the CSI measurement result, and reducing modification to the existing protocol; or the PMI 1 is fed back by using a part of a PMI, and the PMI 2 is fed back by using another part of the PMI, where the part of the PMI and the another part of the PMI are for a same PMI feedback operation, so that a resource used by the PMI to feed back the narrow beam codebook in the existing protocol is used to feed back the wide beam codebook, thereby reducing the resource occupied by the UE to feed back the CSI measurement result; or the PMI 1 is fed back by a part of a PMI, and the PMI 2 is fed back by using the part of the PMI in another feedback operation, where the resource occupied by the part of the PMI may be the resource occupied by a PMI to feed back the wide beam codebook in the existing protocol. This can reduce modification to the existing protocol.

Optionally, the first PMI includes the PMI 1 fed back for the first CSI-RS or the PMI 2 fed back for the second CSI-RS, and the PMI 1 and the PMI 2 are the same. This can reduce the feedback amount of the CSI measurement result of the UE.

Optionally, the third CSI measurement result includes a third precoding matrix indicator (PMI) that is corresponding to a second codebook.

Optionally, the third CSI measurement result is corresponding to the narrow beam codebook (also referred to as a second codebook), and the narrow beam codebook is used to represent narrow beam selection in a corresponding wide beam in the wide beam codebook and co-phasing factor selection between antenna elements in different polarization directions corresponding to the wide beam.

Optionally, the narrow beam codebook is a matrix $W_2$, and $$W_2 \in C_2 = \left\{ \frac{1}{\sqrt{2}} \begin{bmatrix} Y_1 \\ \Psi Y_2 \end{bmatrix} \right\},$$

where $Y_1$ and $Y_2$ each include a selection vector, $Y_1$ is used to represent selection of a narrow beam set in a corresponding wide beam in a wide beam codebook and in a polarization direction, $Y_2$ is used to represent selection of a narrow beam set in a corresponding wide beam in a wide beam codebook and in another polarization direction, $\Psi$ is a diagonal matrix including a co-phasing factor between antenna elements, and each element on a diagonal line is used to represent a phase difference between antenna elements in different polarization directions corresponding to a same column of $Y_2$ and $Y_1$.

Optionally, the second codebook is a matrix $W_2$, and $$W_2 \in C_2 = \left\{ \frac{1}{\sqrt{2}} \begin{bmatrix} Y_1 \\ \Psi Y_2 \end{bmatrix} \right\},$$

where $Y_1$ and $Y_2$ each include a selection vector, $Y_1$ is used to represent a corresponding column vector selection in the first codebook and in a polarization direction, $Y_2$ is used to represent a corresponding column vector selection in the first codebook and in another polarization direction, $\Psi$ is a diagonal matrix including a co-phasing factor between antenna elements, and each element on a diagonal line is used to represent a phase factor between column vectors corresponding to a same column of $Y_2$ and $Y_1$.

Optionally, the third CSI measurement result may further include information about a CSI-RS resource selected by the UE, for example, an identifier.

Optionally, that the third CSI-RS has been precoded according to the first CSI measurement result includes:

determining, by a first wireless network device according to the first CSI measurement result, a first dimension precoding matrix corresponding to the first CSI-RS and a second dimension precoding matrix corresponding to the second CSI-RS; and multiplying, by the first wireless network device, a to-be-sent third CSI-RS by a Kronecher product that is obtained by multiplying a corresponding column in the first dimension precoding matrix by a corresponding column in the second dimension precoding matrix, where the corresponding column is corresponding to an antenna port corresponding to the third CSI-RS.

Optionally, the first CSI-RS and the second CSI-RS are separately configured in different CSI processes, or are configured in a same enhanced CSI process.

Optionally, the configuration includes at least one of a transmission interval, a quantity of ports, an occupied frequency domain resource, or whether wide beam selections of antenna elements in different polarization directions are the same.

Optionally, transmission intervals of the first CSI-RS and the second CSI-RS are longer than a transmission interval of the third CSI-RS.

Optionally, the third CSI measurement result further includes at least one of a CQI or RI.

Optionally, from a perspective of the first wireless network device, the method further includes: notifying, by the first wireless network device, the second wireless network device that the first CSI-RS and/or the second CSI-RS are/is sent by using antenna elements in a same polarization direction, or the first CSI-RS and/or the second CSI-RS are/is sent by using antenna elements in two polarization directions.

Optionally, the notifying, by the first wireless network device, the second wireless network device includes: notifying, by the first wireless network device, the second wireless network device by using a CSI process configured by using the RRC.

Optionally, from a perspective of the first wireless network device, the method further includes: learning, by the second wireless network device from the first wireless network device, that the first CSI-RS and/or the second CSI-RS are/is sent by using antenna elements in a same polarization direction, or the first CSI-RS and/or the second CSI-RS are/is sent by using antenna elements in two polarization directions.

Optionally, the learning, by the second wireless network device from the first wireless network device includes: learning, by the second wireless network device from the first wireless network device, by using the CSI process configured by using the RRC.

A second aspect further provides a wireless network device, including a processor, a memory, and a transceiver.

The memory is configured to store an instruction. The processor is configured to execute the instruction stored in the memory, to control the transceiver to receive and send signals. When the processor executes the instruction stored in the memory, the wireless network device is configured to complete any method that is related to the first wireless network device and that is described in the first aspect.

A third aspect further provides a wireless network device, including a processor, a memory, and a transceiver.

The memory is configured to store an instruction. The processor is configured to execute the instruction stored in the memory, to control the transceiver to receive and send signals. When the processor executes the instruction stored in the memory, the wireless network device is configured to complete any method that is related to the second wireless network device and that is described in the first aspect.

A fourth aspect further provides a multi-antenna channel measurement apparatus. The apparatus includes some modules, configured to implement any method related to the foregoing first wireless network device. Specific modules may be corresponding to steps of each method, and details are not described herein.

A fifth aspect further provides a multi-antenna channel measurement apparatus. The apparatus includes some modules, configured to implement any method related to the foregoing second wireless network device. Specific modules may be corresponding to steps of each method, and details are not described herein.

A sixth aspect further provides a computer storage medium, configured to store some instructions. When being executed, these instructions can complete any method related to the foregoing first wireless network device or second wireless network device.

A seventh aspect further provides a communications system, including the wireless network device provided in the foregoing second aspect and the wireless network device provided in the third aspect.

For ease of understanding, description of some concepts related to the present invention is provided as an example for reference, as follows:

The $3^{rd}$ Generation Partnership Project (3GPP for short) is a project for developing a wireless communications network. In general, an organization related to the 3GPP is referred to as a 3GPP organization.

A wireless communications network is a network that provides a wireless communications function. The wireless communications network may use different communications technologies, such as code division multiple access (CDMA for short), wideband code division multiple access (wideband code division multiple access, WCDMA for short), time division multiple access (TDMA for short), frequency division multiple access (FDMA for short), orthogonal frequency division multiple access (OFDMA for short), single carrier frequency division multiple access (SC-FDMA for short), and carrier sense multiple access with collision avoidance. According to factors such as a capacity, a rate, and a delay of different networks, networks may be divided into a 2G (generation) network, a 3G network, and a 4G network. A typical 2G network includes a global system for mobile communications (GSM for short) network or a general packet radio service (GPRS for short) network. A typical 3G network includes a universal mobile telecommunications system (UMTS for short) network. A typical 4G network includes a long term evolution (LTE for short) network. Alternatively, the UMTS network sometimes may be referred to as a universal terrestrial radio access network (UTRAN for short), and alternatively, the LTE network sometimes may be referred to as an evolved universal terrestrial radio access network (E-UTRAN for short). According to different resource allocation manners, wireless communications networks may be divided into a cellular communications network and a wireless local area network (WLAN for short). The cellular communications network is based on scheduling, and the WLAN is based on contention. All the foregoing 2G, 3G, and 4G networks are cellular communications networks. A person skilled in the art should know that with development of technologies, technical solutions provided in the embodiments of the present invention may also be applied to another wireless communications network such as a 4.5G or 5G network, or another non-cellular communications network. For brevity, in the embodiments of the present invention, the wireless communications network sometimes is referred to as the network.

The cellular communications network is one of wireless communications networks. The cellular communications network uses a cellular wireless networking manner, and connects a terminal device to a network device by using a radio channel, so as to implement mutual communication between moving users. A main feature of the cellular communications network is mobility of the terminal, and the cellular communications network has functions of inter-cell handover and automatic roaming across a local network.

MIMO: multi-input multi-output.

FDD: frequency division duplex.

User equipment (UE for short) is a terminal device, and may be a movable terminal device or an unmovable terminal device. The device is mainly configured to receive or send service data. User equipment may be distributed on a network. In different networks, the user equipment has different names, such as a terminal, a mobile station, a subscriber unit, a station, a cellular phone, a personal digital assistant, a wireless modem, a wireless communications device, a handheld device, a laptop computer, a cordless phone, and a wireless local loop board. The user equipment may communicate with one or more core networks by using a radio access network (RAN for short) (an access part of the wireless communications network), for example, exchange voice and/or data with the radio access network.

A base station (BS for short) device may also be referred to as a base station, and is an apparatus that is deployed in the radio access network and that is configured to provide a wireless communications function. For example, in a 2G network, devices that provide a base station function include a base transceiver station (BTS for short) and a base station controller (BSC for short). In a 3G network, devices that provide a base station function include a NodeB and a radio network controller (RNC for short). In a 4G network, devices that provide a base station function include an evolved NodeB (eNB for short). In a WLAN, a device that provides a base station function is an access point (AP for short).

A wireless network device is a device located in a wireless communications network. The device may be a base station, may be user equipment, or may be another network element.

A wireless local area network (WLAN for short) is a local area network in which a radio wave is used as a data transmission medium, and generally, a transmission distance of the wireless local area network is only tens of meters.

An access point (AP for short) is connected to a wireless network, or may be connected to a device in a wired network. The access point can be used as an intermediate point, so that wired and wireless network devices connect to each other and transmit data.

RRC (radio resource control): a radio resource control protocol.

The RRC processes third layer information of a control plane between UE and a UTRAN. The RRC usually includes at least one of the following functions:

Broadcasting information provided by a non-access stratum of a core network. The RRC is responsible for broadcasting network system information to the UE. System information is usually repeated according to a specific basic rule. The RRC is responsible for planning, segmenting, and repeating the system information, and also supports broadcasting of upper-layer information.

Associating broadcast information with an access stratum. The RRC is responsible for broadcasting the network system information to the UE. The system information is usually repeated according to a specific basic rule. The RRC is responsible for planning, segmenting, and repeating the system information.

Establishing, re-establishing, maintaining, and releasing an RRC connection between the UE and the UTRAN. To establish a first signal connection of the UE, an upper layer of the UE requests establishment of an RRC connection. An RRC connection establishment process includes several steps: re-selection of an available cell, access permission control, and establishing a layer 2 signal link. RRC connection releasing is also requested by the upper layer, and is used to release a final signal connection; or when an RRC link fails, the RRC connection releasing is initiated by an RRC layer. If a connection fails, the UE requests re-establishment of an RRC connection. If the RRC connection fails, the RRC releases an allocated resource.

CRS: cell-specific reference signal.

PMI: A precoding matrix indicator, which is an index corresponding to a codebook selected in a predefined codebook set.

CSI: channel state information.

CSI-RS: channel state information-reference signal.

MAC: media access control.

FDD Massive MIMO: frequency division duplex massive MIMO.

CSI measurement: A second wireless network device detects a CSI-RS sent by a first network device, so as to estimate a state that is of a channel between a first wireless network device and the second wireless network device and that includes precoding matrix information (PMI) used to represent a channel direction, channel quality indicator (CQI) information used to represent channel quality, and rank information (RI) used to represent a quantity of layers of multi-antenna transmission.

CQI: channel quality indicator.

RI: rank indicator.

Omni-directional transmission: Compared with transmission after beamforming, omi-directional transmission means that beamforming is not performed before transmission.

Precoding matrix: a matrix including an eigenvector that is used to represent a direction of a channel between a first wireless network device and a second wireless network device.

First codebook: a wide beam codebook, which is used to represent wide beam selection.

Second codebook: a narrow beam codebook, which is used to represent narrow beam selection in a corresponding wide beam in a wide beam codebook and co-phasing factor selection between antenna elements in different polarization directions corresponding to the wide beam.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
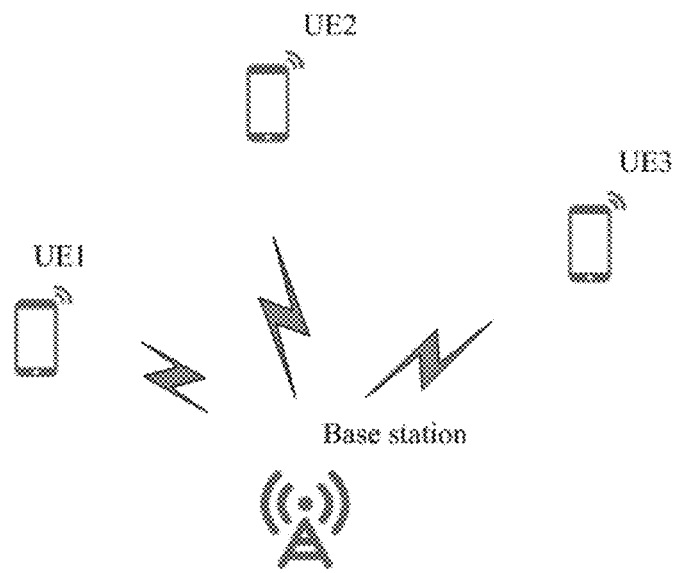
FIG. 1 is a schematic diagram of communication between a base station and UE.

The following describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Terms such as "component", "module", and "system" used in this application are used to indicate computer-related entities. The computer-related entities may be hardware, firmware, combinations of hardware and software, software, or running software. For example, a component may be, but is not limited to, a process that runs on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or a remote process and according to, for example, a signal having one or more data packets (for example, data from one component, where the component interacts with another component in a local system or a distributed system, and/or interacts with another system by using a network, such as the Internet, in a manner of signal transmission).

In addition, this application describes each aspect with reference to a wireless network device. The wireless network device may be a base station, and the base station may be configured to communicate with one or more user equipments, or may be configured to communicate with one or more base stations having some functions of user equipment (for example, communication between a macro base station and a micro base station such as an access point). Alternatively, the wireless network device may be user equipment, and the user equipment may be configured to communicate with one or more user equipments (for example, D2D communication), or may be configured to communicate with one or more base stations. The user equipment may further be referred to as a user terminal, and may include some or all functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless phone, a Session Initiation Protocol (SIP) phone, a smart phone, a wireless local loop (WLL) station, a personal digital assistant (PDA), a laptop computer, a handheld communications device, a handheld computing device, a satellite wireless device, a wireless modem card, and/or another processing device configured to communicate on a wireless system. The base station may further be referred to as an access point, a node, a NodeB, an evolved NodeB (eNB), or another network entity, and may include some or all functions of the foregoing network entity functions. The base station may communicate with the wireless terminal by using an air interface. The communication may be performed by using one or more sectors. The base station may convert a received air interface frame into an IP packet, and is used as a router between the wireless terminal and a remaining part of an access network. The access network includes an Internet Protocol (IP) network. The base station may further coordinate air interface attribute management, and may further be used as a gateway between a wired network and a wireless network.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, the word "example" in the embodiments of the present invention is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of the present invention, "information", "signal", "message", and "channel" may be interchangeably used sometimes. It should be noted that expressed meanings are consistent when differences are not emphasized. "of", "corresponding, relevant", and "corresponding" may be interchangeably used sometimes. It should be noted that expressed meanings are consistent when differences are not emphasized.

In the embodiments of the present invention, sometimes a subscript such as $W_1$ may be written in an incorrect manner such as W1. Expressed meanings are consistent when differences are not emphasized.

Network architectures and service scenarios described in the embodiments of the present invention are to describe the technical solutions in the embodiments of the present invention more clearly, but are not intended to limit the technical solutions provided in the embodiments of the present invention. A person of ordinary skill in the art may understand that with evolution of the network architecture and appearance of a new service scenario, the technical solutions provided in the embodiments of the present invention may also be applicable to a similar technical solution.

The embodiments of the present invention may be not only applied to a time division duplex (TDD) scenario, but also applied to a frequency division duplex (FDD) scenario.

In the embodiments of the present invention, a 4G network scenario in a wireless communications network is used for description. It should be noted that solutions in the embodiments of the present invention may further be applied to another wireless communications network, and correspondingly, a name may also be replaced with a name of a corresponding function in another wireless communications network.

As an antenna quantity of a base station further increases, when a linear array of antennas becomes a two-dimensional planar array of antennas, a configuration of a single CSI-RS cannot support more antenna ports. Theoretically, for a CSI-RS of existing LTE, one resource block RB (resource block) includes a maximum of 40 resource elements REs (resource element). Therefore, 40 orthogonal antenna ports can be supported in theory by constantly increasing a quantity of ports for the CSI-RS. As an antenna quantity continues to increase, a current allocation method in which each antenna port occupies one orthogonal pilot CSI-RS and a method in which UE measures all antenna ports and feeds back an integral PMI are no longer suitable. If the UE needs to estimate channels that are corresponding to all the antenna ports, to calculate an optimal CSI corresponding to a BS. When a quantity of antenna ports increases, calculation complexity on a UE side is excessively high (when CSI calculation is performed, the UE side usually needs to perform traverse calculation on all possible precoding codebooks, and when the antenna quantity is excessively large, calculation complexity of the UE is greatly increased). Increase of a quantity of codebooks leads to rapid increase of a feedback amount on the UE side, and consequently a resource occupied by an uplink control channel further needs to be increased. This reduces a data throughput of an uplink user.

In the embodiments of the present invention, a multi-antenna channel measurement solution is provided, which is applicable to channel measurement in a scenario that a quantity of antenna ports is relatively large. It may be understood that in the embodiments of the present invention, "multi-antenna" indicates a plurality of antenna elements, and may logically indicate a plurality of antenna ports. By using the solutions provided in the embodiments of the present invention, effects such as reducing a CSI-RS pilot overhead when a quantity of antenna ports is relatively large, calculation complexity on a UE side when measuring CSI may be reduced, and a UE feedback overhead may be reduced. The solutions are particularly applicable to a system in which an antenna quantity is relatively large, and uplink and downlink channels are non-reciprocal, for example, an FDD Massive MIMO system.

It should be noted that the method and the apparatus in the embodiments of the present invention may be applied between the base station and the user equipment, may be applied between the base station and the base station (for example, between a macro base station and a micro base station), and may further be applied between the user equipment and the user equipment (for example, a D2D scenario). In all embodiments of the present invention, communication between the base station and the UE is used as an example for description.

FIG. 1 is a schematic diagram of communication between a base station and UE.

The base station may communicate with one or more UEs.

An antenna of the base station may include a plurality of antenna elements. In this case, the antenna may be referred to as an antenna array. At a logical level of the base station, a to-be-sent signal may be mapped to a plurality of antenna ports. It should be noted that an antenna port is a logical concept, and is mainly used to distinguish between different orthogonal pilots. However, an antenna element is a physical concept. In practice, one antenna port may be corresponding to one antenna element, or may be corresponding to a plurality of antenna elements. A specific mapping relationship between the antenna port and the antenna element may be determined according to a system requirement.

Figure 2:
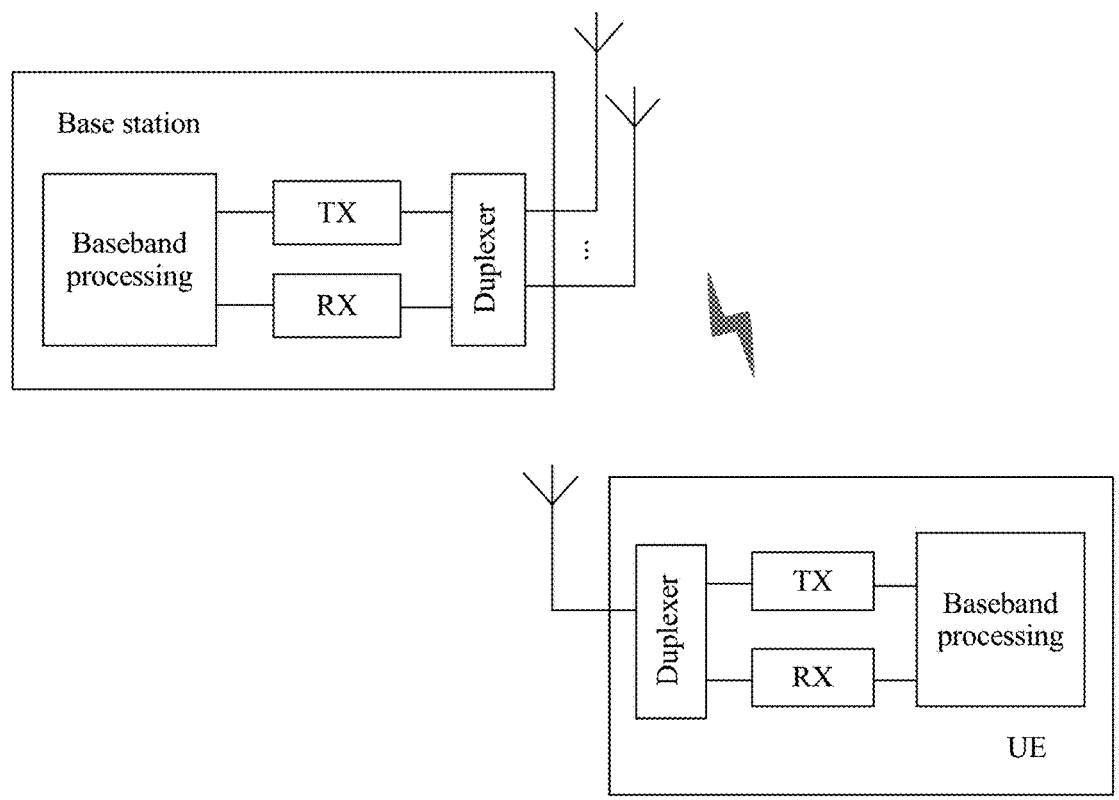
FIG. 2 is a simplified schematic diagram of internal structures of a base station and UE.

FIG. 2 is a simplified schematic diagram of internal structures of a base station and UE.

The base station may include an antenna array, a duplexer, a transmitter (TX), a receiver (RX) (sometimes the TX and the RX are collectively referred to as a transceiver TRX), and a baseband processing part. The duplexer is configured to implement that the antenna array is configured to send and receive signals. The TX is configured to implement conversion between a radio frequency signal and a baseband signal. The TX may usually include a power amplifier PA, a digital-to-analog converter DAC, and an inverter. The RX may usually include a low-noise amplifier LNA, an analog-to-digital converter ADC, and an inverter. The baseband processing part is configured to implement processing of a sent or received signal, such as layer mapping, precoding, modulation/demodulation, encoding/decoding, and perform separate processing on a physical control channel, a physical data channel, a physical broadcast channel, a reference signal, and the like.

In an example, the base station may further include a control part, configured to perform multi-user scheduling and resource allocation, pilot scheduling, user physical layer parameter configuration, and the like.

The UE may include an antenna, a duplexer, a transmitter (TX), a receiver (RX) (sometimes the TX and the RX are collectively referred to as a transceiver TRX), and a baseband processing part. In FIG. 2, the UE has a single antenna. It may be understood that alternatively, the UE may have a plurality of antennas (that is, an antenna array).

The duplexer is configured to implement that the antenna array is configured to send and receive signals. The TX is configured to implement conversion between a radio frequency signal and a baseband signal. The TX may usually include a power amplifier PA, a digital-to-analog converter DAC, and an inverter. The RX may usually include a low-noise amplifier LNA, an analog-to-digital converter ADC, and an inverter. The baseband processing part is configured to implement processing of a sent or received signal, such as layer mapping, precoding, modulation/demodulation, encoding/decoding, and perform separate processing on a physical control channel, a physical data channel, a physical broadcast channel, a reference signal, and the like.

In an example, the UE may also include a control part, configured to request an uplink physical resource, calculate channel state information (CSI) corresponding to a downlink channel, determine whether a downlink data packet is successfully received, and the like.

Figure 3:
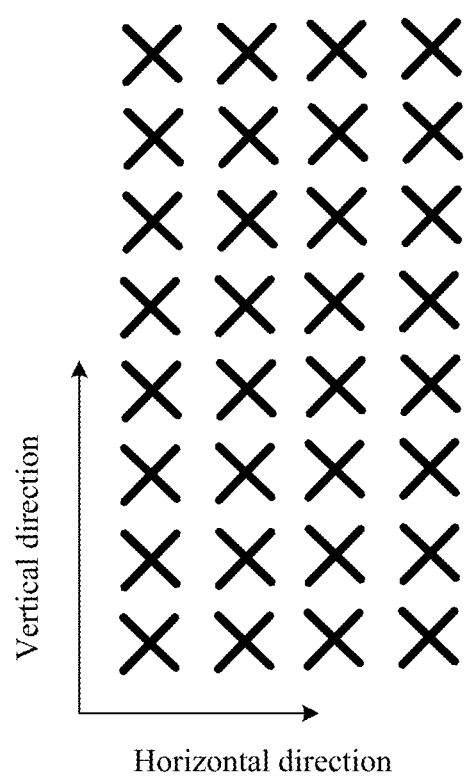
FIG. 3 is a schematic diagram of an antenna array of a base station.

FIG. 3 is a schematic diagram of an antenna array of a base station.

The antenna array includes a plurality of antenna elements in a same polarization direction and antenna elements in another polarization direction.

Figure 4:
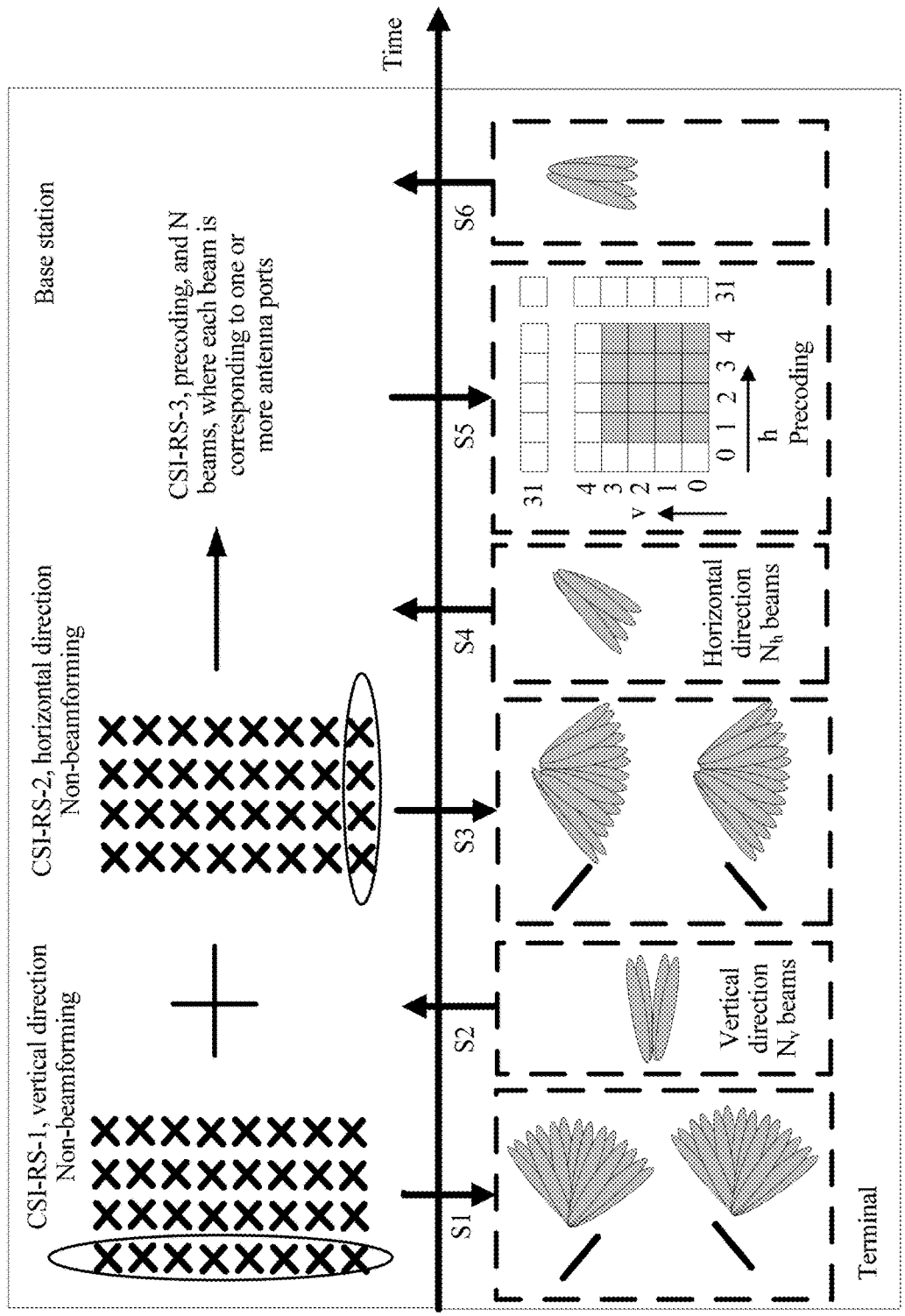
FIG. 4 is a schematic diagram of a CSI measurement process according to an embodiment of the present invention.

Generally, this antenna array may be referred to as dual-polarized antennas. Two polarization directions may be cross polarization, for example, one is leftward rotation, and the other is rightward rotation; or one is +45°, and the other is −45°. FIG. 4 is a schematic diagram of CSI-RS measurement between a base station and UE.

For example, as shown in FIG. 4, a CSI measurement process may include the following steps.

S1. A base station sends a first CSI-RS (CSI-RS-1) to UE.

S3. The base station sends a second CSI-RS (CSI-RS-2) to the UE.

Optionally, the first CSI-RS and the second CSI-RS may be respectively corresponding to elements of two orthogonal dimensions of an antenna array of the base station. As shown in FIG. 4, the first CSI-RS is corresponding to an element in a vertical direction, and the second CSI-RS is corresponding to an element in a horizontal direction.

Optionally, after the UE is connected to a system, the base station may configure the first CSI-RS and the second CSI-RS for the UE by using an RRC configuration/reconfiguration message (RRC configuration for short).

Optionally, the first CSI-RS and the second CSI-RS may be respectively included in two CSI processes. One CSI process is configured by using an RRC information element. The following provides information elements that may be included in a CSI process configuration message (cited from section 6.3.2 in 3GPP TS 36.331):

```
-- ASN1START
CSI-Process-r11 ::=            SEQUENCE {
    csi-ProcessId-r11              CSI-ProcessId-r11,
    csi-RS-ConfigNZPId-r11         CSI-RS-ConfigNZPId-r11,
    csi-IM-ConfigId-r11            CSI-IM-ConfigId-r11,
    p-C-AndCBSRList-r11            SEQUENCE (SIZE (1..2)) OF P-C-AndCBSR-r11,
    cqi-ReportBothProc-r11         CQI-ReportBothProc-r11              OPTIONAL,        -- Need OR
    cqi-ReportPeriodicProcId-r11   INTEGER (0..maxCQI-ProcExt-r11)     OPTIONAL,        -- Need OR
    cqi-ReportAperiodicProc-r11    CQI-ReportAperiodicProc-r11         OPTIONAL,        -- Need OR
    ...,
    [[  alternativeCodebookEnabledFor4TXProc-r12  ENUMERATED {true}  OPTIONAL,-- Need ON
        csi-IM-ConfigIdList-r12        CHOICE {
            release                        NULL,
            setup                          SEQUENCE (SIZE (1..2)) OF CSI-IM-ConfigId-r12
        }                                                              OPTIONAL,-- Need ON
        cqi-ReportAperiodicProc2-r12   CHOICE {
            release                        NULL,
            setup                          CQI-ReportAperiodicProc-r11
        }                                                              OPTIONAL -- Need ON
    ]]
}
P-C-AndCBSR-r11 ::= SEQUENCE {
    p-C-r11                        INTEGER (-8..15),
    codebookSubsetRestriction-r11  BIT STRING
}
-- ASN1STOP
``` csi-ProcessId-r11 represents a process ID of the CSI process. csi-RS-ConfigNZPId-r11 and csi-IM-ConfigId-r11 respectively represent an identification number corresponding to a non-zero power CSI-RS and an identification number corresponding to interference measurement CSI-RS that are in the CSI process. CSI-RS resources corresponding to the two identification numbers form a group of CSI-RS resources. The non-zero power CSI-RS corresponding to csi-RS-ConfigNZPId-r11 is configured by using a CSI-RS-ConfigNZP information element. Content of the CSI-RS-ConfigNZP information element is as follows (cited from section 6.3.2 in 3GPP TS 36.331):

represents one time-frequency resource granularity: one time-domain symbol or one frequency-domain subcarrier. In the LTE, logical ports of the CSI-RS are ports 15-22, every two adjacent ports jointly multiplex two adjacent time-frequency resources by using an orthogonal cover code (Orthogonal Cover Code). The interference measurement CSI-RS corresponding to csi-IM-ConfigId-r11 may be configured by using a csi-IM-Config-r11 information element, and a quantity of antenna ports corresponding to csi-IM-ConfigId-r11 is equal to a quantity of antenna ports corresponding to the non-zero power CSI-RS in the CSI process

Figure 7A:
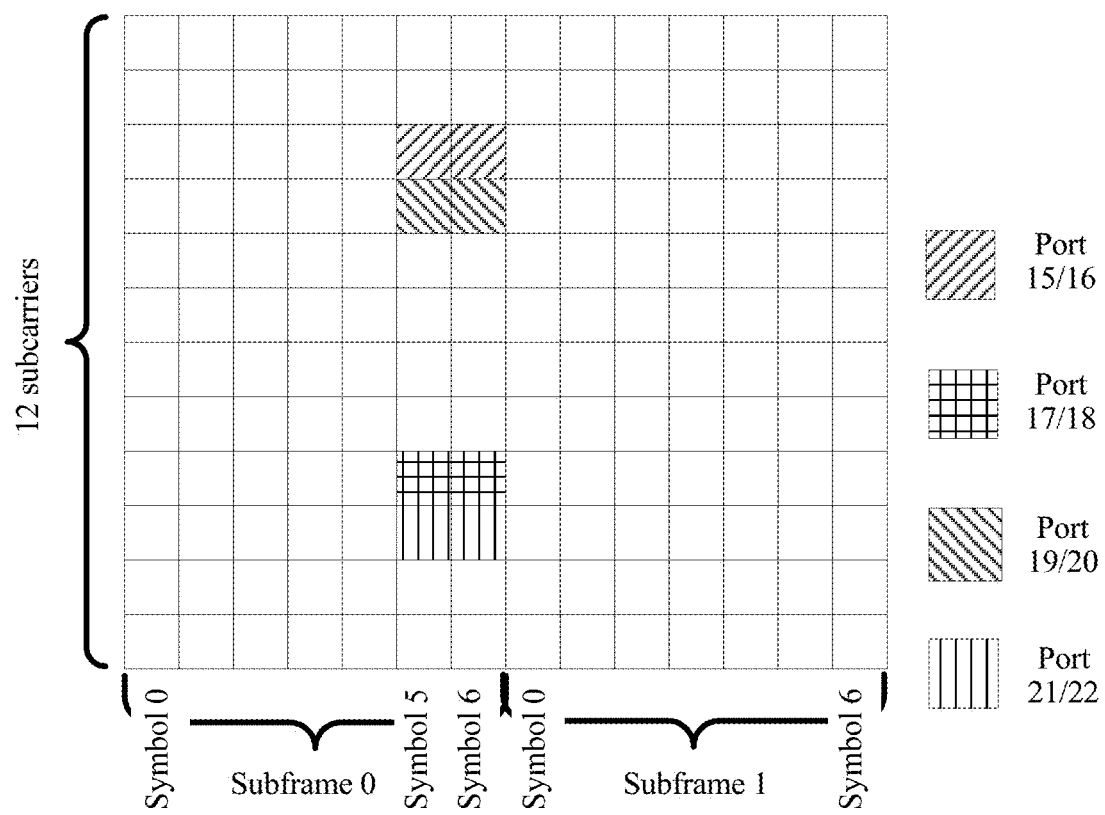
FIG. 7a and FIG. 7b are schematic diagrams of a CSI-RS when there are eight antenna ports according to an embodiment of the present invention.

```
-- ASN1START
CSI-RS-ConfigNZP-r11 ::=        SEQUENCE {
    csi-RS-ConfigNZPId-r11      CSI-RS-ConfigNZPId-r11,
    antennaPortsCount-r11           ENUMERATED    {an1, an2, an4,
an8},
    resourceConfig-r11              INTEGER (0..31),
    subframeConfig-r11              INTEGER (0..154),
    scramblingIdentity-r11          INTEGER (0..503),
    qcl-CRS-Info-r11                SEQUENCE {
        qcl-ScramblingIdentity-r11      INTEGER (0..503),
        crs-PortsCount-r11              ENUMERATED    {n1, n2, n4,
spare1},
        mbsfn-SubframeConfigList-r11    CHOICE {
            release                         NULL,
            setup                           SEQUENCE {
                subframeConfigList
    MBSFN-SubframeConfigList
            }
        }                               OPTIONAL -- Need ON
    }                                   OPTIONAL,-- Need OR
    ...
}
-- ASN1STOP
``` antennaPortsCount-r11 represents a quantity of antenna ports corresponding to the non-zero power CSI-RS (such an antenna port may be referred to as a CSI-RS port). resource-Config-r11 represents a configuration type corresponding to the non-zero power CSI-RS, and indicates a physical time-frequency resource corresponding to the non-zero power CSI-RS. FIG. 7a is a schematic diagram of a physical time-frequency resource block that is occupied by a CSI-RS when CSI-RS resources are configured for eight antenna ports according to existing LTE. One physical time-frequency resource block includes 12 consecutive frequency-domain subcarriers and two consecutive time-domain subframes. Each sub-frame includes seven (corresponding to a normal cyclic prefix) or six (corresponding to an extended cyclic prefix) time-domain symbols. In the figure, one grid (the two quantities are the same by default in an existing standard). In addition, in the existing standard, a quantity of antenna ports corresponding to the interference measurement CSI-RS is the same as the quantity of antenna ports corresponding to the non-zero power CSI-RS by default.

The first CSI-RS and the second CSI-RS may be separately configured by using two independent CSI processes.

Optionally, alternatively, the first CSI-RS and the second CSI-RS may be configured by using an enhanced CSI process. In the enhanced CSI-RS process, two groups of CSI-RS resources may be simultaneously configured. As shown below, the CSI-RS resources are respectively corresponding to a CSI-RS resource in a vertical dimension (the first CSI-RS) and a CSI-RS resource in a horizontal dimension (the second CSI-RS).

```
-- ASN1START
CSI-Process-r13 ::=             SEQUENCE {
    csi-ProcessId-r13               CSI-ProcessId-r13,
    csi-RS-ConfigNZPId-Horizontal-r13       CSI-RS-ConfigNZPId-r13,
    csi-IM-ConfigId-Horizontal-r13          CSI-IM-ConfigId-r13,
    p-C-AndCBSRList-Horizontal-r13SEQUENCE    (SIZE    (1..2))    OF
P-C-AndCBSR-r13,
    csi-RS-ConfigNZPId-Vertical-r13         CSI-RS-ConfigNZPId-r13,
    csi-IM-ConfigId-Vertical-r13            CSI-IM-ConfigId-r13,
    p-C-AndCBSRList-Vertical-r13            SEQUENCE (SIZE (1..2)) OF
P-C-AndCBSR-r13,
    cqi-ReportBothProc-r13          CQI-ReportBothProc-r13
OPTIONAL,                -- Need OR
    cqi-ReportPeriodicProcId-r13 INTEGER (0..maxCQI-ProcExt-r13)
OPTIONAL,                -- Need OR
    cqi-ReportAperiodicProc-r13 CQI-ReportAperiodicProc-r13
OPTIONAL,                -- Need OR
    ...,
    [[   alternativeCodebookEnabledFor4TXProc-r12    ENUMERATED
```

```
{true}   OPTIONAL,-- Need ON
           csi-IM-ConfigIdList-r12          CHOICE {
                       release              NULL,
                       setup                SEQUENCE (SIZE (1..2)) OF
CSI-IM-ConfigId-r12
           }                                OPTIONAL,-- Need ON
           cqi-ReportAperiodicProc2-r12     CHOICE {
                       release              NULL,
                       setup                CQI-ReportAperiodicProc-r11
           }                                OPTIONAL -- Need ON
       ]]
   }
   P-C-AndCBSR-r13 ::= SEQUENCE {
       p-C-Horizontal-r13                   INTEGER (-8..15),
       codebookSubsetRestriction-Horizontal-r13 BIT STRING,
       p-C-Vertical-r13                     INTEGER (-8..15),
       codebookSubsetRestriction-Vertical-r13    BIT STRING
   }
   -- ASN1STOP
``` csi-ProcessId-r13 represents a process ID of the CSI process. csi-RS-ConfigNZPId-Horizontal-r13 represents an identification number corresponding to the non-zero power CSI-RS included in the horizontal-dimension CSI-RS, csi-IM-ConfigId-Horizontal-r13 represents an identification number corresponding to the interference measurement CSI-RS included in the horizontal-dimension CSI-RS, and CSI-RS resources corresponding to the two identification numbers form a group of horizontal-dimension CSI-RS resources. csi-RS-ConfigNZPId-Vertical-r13 represents an identification number corresponding to the non-zero power CSI-RS included in the vertical-dimension CSI-RS, csi-IM-ConfigId-Vertical-r13 represents an identification number corresponding to the interference measurement CSI-RS included in the vertical-dimension CSI-RS, and CSI-RS resources corresponding to the two identification numbers form a group of vertical-dimension CSI-RS resources.

Optionally, the configuration may include at least one of a transmission interval, a quantity of ports, an occupied frequency domain resource, whether wide beam selections of antenna elements in different polarization directions are the same, using antenna elements in a single polarization direction or antenna elements in two polarization directions, or the like.

Optionally, a quantity of antenna ports corresponding to the first CSI-RS and a quantity of antenna ports corresponding to the second CSI-RS each are a value, such as 2, 4, 8, 12, and 16, in CSI-RS port configuration supported by the system. A specific value of the quantity of the antenna ports may be determined according to a standard requirement or a system requirement, and this is not limited herein.

For a two-dimensional antenna array, as shown in FIG. 3, cross polarization antennas are usually used. A quantity of each column of antenna elements may be a quantity of one column of antenna elements in a polarization direction (for example, in FIG. 3, a same polarization direction of a vertical direction includes eight antenna elements), or may be a quantity of one column of antenna elements in two cross polarization directions (for example, in FIG. 3, two polarization directions of a vertical direction include 16 antenna elements). Likewise, a quantity of each row of antenna elements may be a quantity of one row of antenna elements in a polarization direction (for example, in FIG. 3, a same polarization direction of a horizontal direction includes four antenna elements), or may be a total quantity of one row of antenna elements in two cross polarization directions (for example, in FIG. 3, two polarization directions of a horizontal direction includes eight antenna elements). In this embodiment of the present invention, when two polarization directions are described, as shown in FIG. 3, a total quantity of 64 antenna elements are described as eight rows and a quantity of antenna elements of each row is eight, or as four columns and a quantity of antenna elements of each column is 16. When one polarization direction is described, a total quantity of antenna elements are described as eight rows, and a quantity of antenna elements of each row is four; or a total quantity of antenna elements are described as four columns, and a quantity of antenna elements of each column is eight. Certainly, alternatively, another manner may be used for description. A specific expression may be predefined, or implementation of the expression may be determined by the base station.

Optionally, for example, the two-dimensional antenna array of the antenna of the base station includes antenna elements in a vertical direction and antenna elements in a horizontal direction. The base station may select a column of antenna elements from the vertical direction of the two-dimensional antenna array, and select a row of antenna elements from the horizontal direction. A specific selection manner may be random, may be preset, or may be selected according to a rule. Selection manners in the vertical direction and the horizontal direction may be the same or different. Specific selection may be determined according to an actual requirement or a design of a system, and details are not described herein. For example, each element in the vertical direction is corresponding to one port in the first CSI-RS, each element in the horizontal direction is corresponding to one port in the second CSI-RS, and both the first CSI-RS and the second CSI-RS are sent omni-directionally.

Optionally, when configuring the first CSI-RS and/or the second CSI-RS, in addition to a quantity of CSI-RS antenna ports, the base station may indicate whether a same codebook is selected for antenna elements in different polarization directions (for example, indicate that UE uses a subsequent feedback manner (2a) or (2b)) when a corresponding CSI is fed back. The quantity of the CSI-RS antenna ports is configured by using a non-zero power CSI-RS resource in a CSI process.

A CSI-RS may be sent by antenna elements in a same polarization direction or may be sent by antenna elements in two cross polarization directions (that is, the first CSI-RS and the second CSI-RS each have two different CSI-RS sending manners). The two different CSI-RS sending manners may not affect subsequent selection and feedback of a first codebook by UE. For example, when a CSI-RS is sent by using antenna elements in only a same polarization direction (for example, a polarization direction 1), codebook selection and feedback of another polarization direction (for example, a polarization direction 2) are the same as those of the polarization direction 1 by default. Specifically, the two CSI-RS sending manners may be separately described below. Sending manners of the first CSI-RI and the second CSI-RI are similar, and therefore are not distinguished herein for description.

Figure 5A:
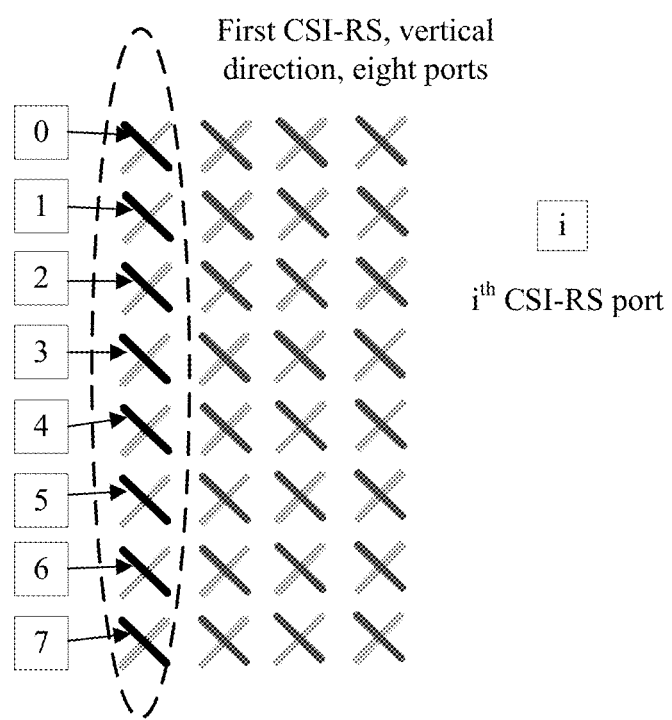
FIG. 5a and FIG. 5b are schematic diagrams of CSI-RS sending manners according to an embodiment of the present invention.

(1a) A first sending manner is shown in FIG. 5a. A CSI-RS is sent from antenna elements in a same polarization direction. This is different from a multi-antenna sending manner in existing LTE.

Figure 5B:
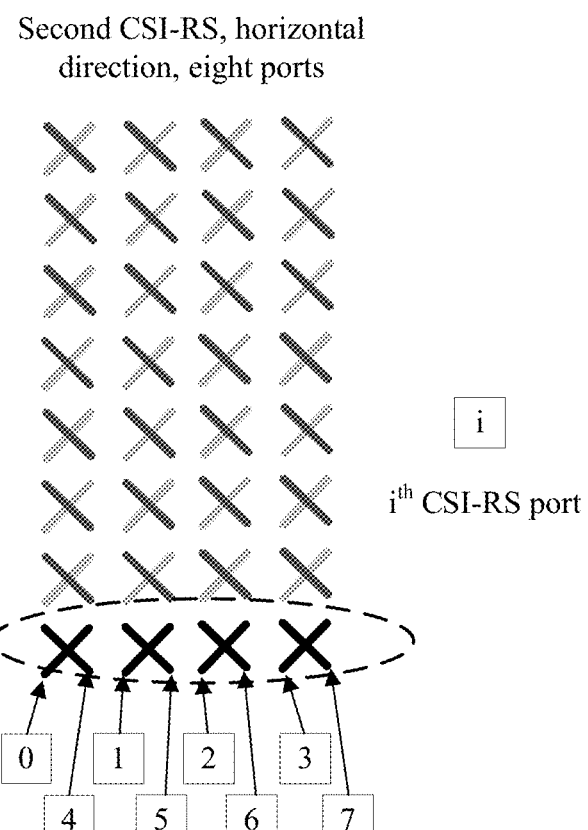

(1b) A second sending manner is shown in FIG. 5b. The CSI-RS is sent from antenna elements in two polarization codebook $W_1$, and $i_2$ represents a codebook index corresponding to the second codebook $W_2$. When providing feedback, the UE may directly feed back $i_1$ and $i_2$. $i_1$ is an integer value in 0-15, and may represent a selected one in 16 wide beams; and $i_2$ is also an integer value in 0-15, and may represent a selected narrow beam in each wide beam (a situation in which the rank is 1). Each wide beam includes four narrow beams, there are four phase situations corresponding to the four narrow beams, and therefore, $i_2$ has 16 values. After receiving $i_1$ and $i_2$ fed back by the UE, the base station may determine a corresponding precoding codebook according to the following table. $W_{p,q}^{(1)}$ represents a codebook that is formed by combining by the first codebook $W_1$ and the second codebook $W_2$ when the rank is 1, and $W_{p,q}^{(1)} = W_1 * W_2$.

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{p,q}^{(1)} = \frac{1}{\sqrt{8}} \begin{bmatrix} v_p \\ \varphi_q v_p \end{bmatrix}$ directions. This is the same as a CSI-RS sending manner when there are eight antennas in the existing LTE.

A sending manner of the first CSI-RS may be either of the foregoing two sending manners (1a) and (1b), and a sending manner of the second CSI-RS may also be either of the foregoing two sending manners (1a) and (1b).

Optionally, an execution sequence of S1 and S3 is not limited in this embodiment of the present invention.

S2. The UE performs CSI measurement on the first CSI-RS according to RRC configuration of the base station and the received first CSI-RS, and feeds back an index (which is part of a precoding matrix indicator PMI and is corresponding to a wide beam codebook) corresponding to a first codebook in a precoding matrix for the first CSI-RS. In this embodiment, the first codebook is denoted as $W_{1v}$.

S4. The UE performs CSI measurement on the second CSI-RS according to the RRC configuration of the base station and the received second CSI-RS, and feeds back an index (which is a part of the precoding matrix indicator PMI and is corresponding to the wide beam codebook) corresponding to a first codebook in a precoding matrix for the second CSI-RS. In this embodiment, the first codebook is denoted as $W_{1h}$. Optionally, for a design of the first codebook and a design of the codebook index that are fed back by the UE in S2 and/or S4, refer to a design in an existing LTE protocol. The design in the existing LTE protocol is as follows (cited from section 7.2.4 in TS 36.213, Because letter subscripts are the same as other subscripts in this embodiment of the present invention, other letters are used for description, for example, m is replaced by p, n is replaced by q, and j is replaced by y):

The following table shows a precoding codebook and a corresponding codebook index when a rank in an eight-antenna double codebook structure in LTE R12 is 1. $i_1$ represents a codebook index corresponding to the first where:

$\varphi = e^{j\pi q/2}; v_p = [1\ e^{j2\pi p/32}\ e^{j4\pi p/32}\ e^{j6\pi p/32}]^T$ $p = 2i_1, 2i_1+1, 2i_1+4, 2i_1+3;$ $q = 0, 1, 2, 3;$ $i_1 = 0, 1, 2, 3 \ldots 15;$ $i_2 = 0, 1, 2, 3 \ldots 15.$ In the foregoing codebook correspondence table, a form of $W_1$ is as follows:

$$W_1^{(i_1)} = \begin{bmatrix} X^{(i_1)} & 0 \\ 0 & X^{(i_1)} \end{bmatrix}$$

$i_1$ represents an $i_1^{th}$ wide beam, each wide beam includes four consecutive narrow beams (column vector), and therefore, $X^{(i_1)}$ includes four column vectors (each column is corresponding to one narrow beam). An eight-antenna codebook whose rank is 1 includes 16 wide beams in total. Therefore, 16 $i_1$ values may be used to perform indexing on each wide beam. $X^{(i_1)}$ at an upper left corner is corresponding one polarization direction, and $X^{(i_1)}$ at a lower right corner is corresponding to another polarization direction.

The system supports 32 narrow beams that are corresponding to 16 wide beams, and therefore, each wide beam may be defined as $X^{(i_1)} \in \{[c_{2i_1 \bmod 32}\ c_{(2i_1+1) \bmod 32}\ c_{(2i_1+2) \bmod 32}\ c_{(2i_1+3) \bmod 32}] : i = 0, 1, \ldots, 15\}$.

In $X^{(i_1)}$ each column is corresponding to one narrow beam that is corresponding to one column in the following matrix C:

$$C = [\, c_0 \quad c_1 \quad \ldots \quad c_{31} \,], [C]_{y,k} = e^{j\frac{2\pi yk}{K+1}},$$

y=0,1,2,3; k=0,1,2, . . . ,K; K=31

$c_k$ is a column vector including four elements, and $[C]_{y,k}$ represents an element value of a $y^{th}$ row and a $k^{th}$ column in the matrix C.

The second codebook $W_2$ is jointly formed by narrow beam selection (one or several column vectors that are related to a value of the rank) in wide beams (all column vectors that are in $W_1$ and that include two polarization directions) and co-phasing factor selection between polarization antennas. In the eight-antenna codebook whose rank is 1 in LTE, $W_2$ includes four possible beam selections and four possible polarization antenna co-phasing (co-phasing) factors, 16 optional matrices may be formed in total (therefore, $i_2$=0, 1, 2, 3 . . . 15), as follows:

$$W_2 \in C_2 = \left\{ \frac{1}{\sqrt{2}} \begin{bmatrix} Y \\ \Psi Y \end{bmatrix} \right\}$$

$Y \in \{\tilde{e}_1, \tilde{e}_2, \tilde{e}_3, \tilde{e}_4\},$ $\Psi \in \{1, -1, j, -j\}$ $\tilde{e}_f$ is a 4×1 selection vector, only an $f^{th}$ element is 1, and remaining elements are 0. $\Psi$ is a co-phasing factor between polarization antennas and is used to represent a phase difference between beams of two polarization antennas. In this way, a finally combined precoding matrix can be obtained by means of $W_1*W_2$.

Optionally, in FIG. 4, the first codebook $W_{1h}$ fed back by the UE includes $N_h$ narrow beams, and $W_{1v}$ includes $N_v$ narrow beams. The first codebook is corresponding to the wide beam codebook.

Optionally, in S2 and/or S4, for manners in which the UE performs CSI measurement and feeds back the first codebook, refer to manners in the prior art such as a manner defined in a 3GPP protocol. For example, an indexing manner may be used for feeding back the first codebook and/or the second codebook.

Optionally, in S2 and/or S4, the CSI measurement result fed back by the UE may include a first PMI. The first PMI includes a PMI 1 fed back for the first CSI-RS and a PMI 2 fed back for the second CSI-RS.

Optionally, the PMI 1 and the PMI 2 are different.

Optionally, after being jointly encoded, the PMI 1 and the PMI 2 are fed back by using a part of a PMI; or the PMI 1 is fed back by using a part of a PMI, and the PMI 2 is fed back by using another part of the PMI; or the PMI 1 is fed back by using a part of a PMI, and the PMI 2 is fed back by using the part of the PMI in another feedback operation.

Optionally, the first PMI includes the PMI 1 fed back for the first CSI-RS or the PMI 2 fed back for the second CSI-RS, and the PMI 1 and the PMI 2 are the same. In this case, the UE may indicate that the base station PMI 1 and the PMI 2 are the same. Therefore, a resource occupied by CSI feedback of the UE is reduced.

Optionally, in S2 and/or S4, the UE may not feed back any one of the second codebook, a CQI, or RI. The second codebook is a narrow beam codebook.

Optionally, a feedback manner of $W_{1h}$ and/or a feedback manner of $W_{1v}$ may be one of the following (2a) and (2b).

A specific feedback manner may be selected according to a final standard or a system design.

(2a) The feedback manner of $W_{1h}$ and/or the feedback manner of $W_{1v}$ may be a form of $W_1$ that is supported by the existing LTE.

$W_1$ that is currently supported by the LTE includes one block diagonal matrix (in this case, both the first CSI-RS and the second CSI-RS are sent in the foregoing manner (1b)), and includes two same non-zero sub-matrices in total, that is, $$W_1 = \begin{bmatrix} X & 0 \\ 0 & X \end{bmatrix}.$$

X is wide beam feedback that is corresponding to a same polarization direction and that includes a plurality of narrow beams. In an example, X at an upper left corner is wide beam feedback corresponding to a +45° polarization direction, and X at a lower right corner is wide beam feedback corresponding to a −45° polarization direction. Each column of X may be physically corresponding to one narrow beam. Mathematically, each column of X is respectively corresponding to a column of a matrix $\overline{X}$. An element in an $i^{th}$ row and a $j^{th}$ column of the matrix $\overline{X}$ is $$\overline{X_{i,k}} = e^{j\frac{2\pi(i-1)(k-1)}{K}},$$

i∈{1,2, . . . I}, k∈{1,2, . . . , K}. I is a quantity of ports in a same polarization direction (corresponding to a quantity of rows of X), and is a half of a quantity of ports of the CSI-RS. K is a quantity of narrow beams supported by the system. The wide beam X includes a plurality of narrow beams, and a quantity of narrow beams may be a quantity of columns included in X. In the LTE, one wide beam X may include four, eight, or another quantity of narrow beams. To reduce a feedback amount, the system usually limits a maximum quantity of narrow beams that are supported, for example, an LTE eight-antenna codebook solution includes at most 32 narrow beams, that is, K is 32.

When the CSI-RS is sent in the foregoing manner (1a) (that is, sending the CSI-RS in only a same polarization direction), $W_1$ is no longer a block diagonal matrix with a form $$\begin{bmatrix} X & 0 \\ 0 & X \end{bmatrix},$$

but is equal to X, that is, $W_1$=[X]. Each column of X is a column of the matrix $\overline{X}$. The element in an $i^{th}$ row and a $j^{th}$ column of the matrix $\overline{X}$ is $$\overline{X_{i,j}} = e^{j\frac{2\pi(i-1)(j-1)}{K}},$$

i∈{1,2, . . . ,I}, j∈{1,2, . . . ,K}. I is a quantity of ports of the CSI-RS, and K is a quantity of all narrow beams supported by the system.

For a case in which $W_1$=[X], the UE feeds back an index corresponding to X. After receiving the index corresponding to X, the base station may automatically obtain X (or an index of X) in another polarization direction according to feedback in a polarization direction corresponding to the index X, for subsequent precoding of a third CSI-RS (CSI-RS-3). In general, X in the another polarization direction is the same as X in the fed back polarization direction by default.

For a form $$W_1 = \begin{bmatrix} X & 0 \\ 0 & X \end{bmatrix},$$

to reduce a resource occupied by feedback, the UE may feed back only the index corresponding to X. After receiving the index corresponding to X, the base station automatically obtains $W_1$ according to the index corresponding to X.

In this application, first codebooks $W_{1v}$ and $W_{1h}$ are respectively corresponding to a wide beam in a vertical direction and a wide beam in a horizontal direction. In an optional example, beam widths and wide beam numbers corresponding to the horizontal wide beam and the vertical wide beam may be different, that is, X of $W_{1h}$ and X of $W_{1v}$ are different. That is, at least one of a quantity of columns, a quantity of rows, or an element that is included in X is different. In another optional example, both beam widths corresponding to the horizontal wide beam and the vertical wide beam and quantities of wide beams included in the horizontal wide beam and the vertical wide beam are the same, that is, X of $W_{1h}$ and X of $W_{1v}$ are the same and include a same quantity of columns, rows, and elements.

Optionally, when X of $W_{1v}$ and X of $W_{1h}$ are different, the UE may use resources occupied by $^{i1}$ and $^{i2}$ in the foregoing existing LTE protocol to separately feed back indexes corresponding to X of $W_{1v}$ and X of $W_{1h}$. After receiving the indexes corresponding to X of $W_{1v}$ and X of $W_{1h}$, the base station determines a codebook of $W_{1v}$ and a codebook of $W_{1h}$ according to $^{i1}$ and $^{i2}$.

Optionally, when X of $W_{1v}$ and X of $W_{1h}$ are different, the UE may use a resource occupied by $^{i1}$ in the foregoing existing LTE protocol to separately feed back indexes corresponding to X of $W_{1v}$ and X of $W_{1h}$ in two times. After receiving the indexes corresponding to X of $W_{1v}$ and X of $W_{1h}$, the base station separately determines the codebook of $W_{1v}$ and the codebook of $W_{1h}$ according to the received $^{i1}$.

Optionally, when X of $W_{1v}$ and X of $W_{1h}$ are the same, the UE may use the resource occupied by $^{i1}$ in the foregoing existing LTE protocol to feed back the indexes corresponding to X of $W_{1v}$ and X of $W_{1h}$, and notifies the base station that X of $W_{1v}$ and X of $W_{1h}$ are the same by using another field.

It may be understood that forms of the codebook of $W_{1v}$ and the codebook of $W_{1h}$ may be the same as or different from a form of $W_1$ in the existing LTE protocol. For example, according to system evolution, a quantity of supported narrow beams is greater than 32, a quantity of supported wide beams is greater than 16, or a quantity of narrow beams included in each wide beam is not equal to 4. Accordingly, a design of $W_1$ is changed.

(2b) Alternatively, $W_{1h}$ and/or $W_{1v}$ may be not the form of W1 supported by the existing LTE (in this case, both the first CSI-RS and the second CSI-RS are sent in the foregoing manner (1b)).

For example, the first codebooks $W_{1h}$ and $W_{1v}$ fed back by the UE may be separately used to perform wide beam selection for all polarization directions (that is, narrow beams included in a wide beam of all the polarization directions are different). The form of $W_1$ may be modified as $$W_1 = \begin{bmatrix} X_1 & 0 \\ 0 & X_2 \end{bmatrix}.$$

This may ensure that an independent and optimal beam set is selected for each polarization direction.

Optionally, the UE feeds back a codebook index of $X_1$ and a codebook index of $X_2$ for each CSI-RS. The UE may feed back $X_1$ by using the resource occupied by $^{i1}$ in the existing LTE protocol. In this case, $^{i2}$ does not need to be fed back, and therefore, the resource occupied by $^{i2}$ may be used to feed back the codebook index corresponding to $X_2$, or $X_1$ and $X_2$ are jointly encoded for feedback. The joint encoding may be performed by means of differential coding, for example, feeding back an entire $X_1$ codebook and a differential codebook formed by different beams between $X_2$ and $X_1$.

In an example, some columns corresponding to $X_1$ and $X_2$ may be the same. It means that a narrow beam corresponding to the column is better for antennas in two polarization directions. It may be understood that compared with a feedback mode in (2a), a maximum overhead of a feedback mode in (2b) is twice as high as that in (2a).

The first codebooks $W_{1v}$ and $W_{1h}$ are respectively corresponding to a wide beam in a vertical direction and a wide beam in a horizontal direction. In an optional example, both beam widths corresponding to the horizontal wide beam and the vertical wide beam and wide beam numbers included in the horizontal wide beam and the vertical wide beam may be different, that is, $X_1$ of $W_{1h}$ is different from $X_1$ of $W_{1v}$, and/or $X_2$ of $W_{1h}$ is different from $X_2$ of $W_{1v}$. That is, at least one of a quantity of columns, a quantity of rows, or an element that is included in $X_1$ of $W_{1h}$ and $X_1$ of $W_1$ (and/or $X_2$ of $W_{1h}$ and $X_2$ of $W_{1v}$) is different. In another optional example, both beam widths corresponding to the horizontal wide beam and the vertical wide beam and wide beam numbers included in the horizontal wide beam and the vertical wide beam are the same, that is, $X_1$ of $W_{1h}$ and $X_1$ of $W_{1v}$ are the same, $X_2$ of $W_{1h}$ and $X_2$ of $W_{1h}$ are the same, and include a same quantity of columns, rows, and elements.

Optionally, an execution sequence of S2 and S4 is not limited in this embodiment of the present invention. It may be understood that S2 follows S1, and S4 follows S3. S2 and S4 may be simultaneously performed for feedback, for example, feedback in a same PMI.

S5. The base station sends a third CSI-RS to the UE.

Optionally, configuration information of the third CSI-RS may be configured for the UE by using RRC, a control element on a MAC layer, or a physical control channel.

Figure 6:
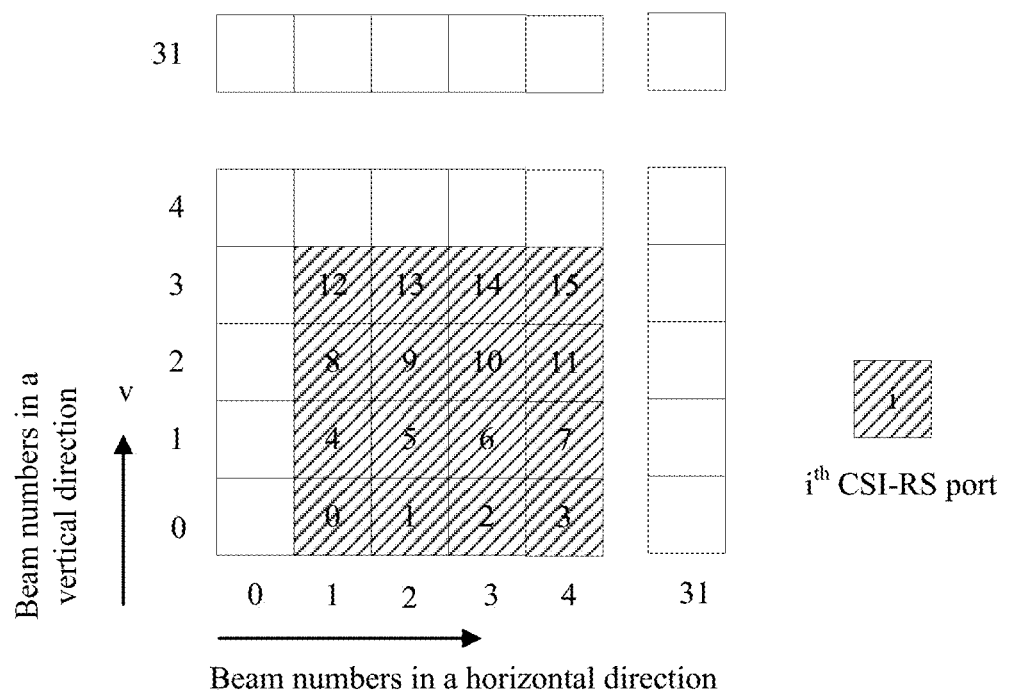
FIG. 6 is a schematic diagram of a mapping relationship between a beam and a CSI-RS port number according to an embodiment of the present invention.

Optionally, the third CSI-RS is sent after being beam-formed by the base station according to codebooks indicated by $W_{1h}$ and $W_{1v}$ that are fed back by the UE in S2 and S4. A CSI-RS resource corresponding to the third CSI-RS includes $N_{v1}*N_{h1}+N_{v2}*N_{h2}$ (when $N_{v1}=N_{v2}=N_v$ and $N_{h1}=N_{h2}=N_h$, a quantity of CSI-RS ports is $2*N_v*N_h$) CSI-RS ports in total, or less than $N_{v1}*N_{h1}+N_{v2}*N_{h2}$ ($2*N_v*N_h$) CSI-RS ports. $N_{v1}$ is a quantity of columns (a quantity of narrow beams) included in a polarization direction (a polarization direction 1) of a vertical direction, $N_{v2}$ is a quantity of columns (a quantity of narrow beams) included in another polarization direction (a polarization direction 2) of the vertical direction, $N_{h1}$ is a quantity of columns (a quantity of narrow beams) included in a polarization direction (the polarization direction 1) of a horizontal direction, and $N_{h2}$ is a quantity of columns (a quantity of narrow beams) included in another polarization direction (the polarization direction 2) of the horizontal direction. Each port may be corresponding to one precoded narrow beam. A mapping relationship between the narrow beam and a CSI-RS port number may be shown in FIG. 6. In FIG. 6, one port is corresponding to one narrow beam. In another example, alternatively, a plurality of ports may be corresponding to one narrow beam. In FIG. 6, antenna port mapping is performed first according to a dimension, for example, a horizontal dimension, and then port mapping is performed according to another dimension, for example, a vertical dimension. It should be noted that FIG. 6 merely gives an example, and only port mapping in one polarization direction is drawn. A port mapping in the another polarization direction is similar, and details are not described herein again.

Optionally, that the third CSI-RS has been precoded according to the first CSI measurement result includes:

determining, by a first wireless network device according to the first CSI measurement result, a first dimension precoding matrix corresponding to the first CSI-RS and a second dimension precoding matrix corresponding to the second CSI-RS; and multiplying, by the first wireless network device, a to-be-sent third CSI-RS by a Kronecher product that is obtained by multiplying a corresponding column in the first dimension precoding matrix by a corresponding column in the second dimension precoding matrix, where the corresponding column is corresponding to an antenna port corresponding to the third CSI-RS.

Optionally, a beamforming method may be one of (3a) and (3b). Selection of (3a) or (3b) may be selected according to a standard or determined according to a system design. This is not limited herein.

(3a) For a situation in which $W_{1h}$ and $W_{1v}$ use the foregoing feedback manner (2a) or (2c) for feedback, that is, a situation in which $$W_1 = \begin{bmatrix} X & 0 \\ 0 & X \end{bmatrix}$$

(corresponding to the manner (2a)) or a situation in which $W_1 = X$ (corresponding to the manner (2b))

Optionally, the following example is used herein for description: A CSI-RS of a zeroth CSI-RS port to a $(N_v*N_h-1)^{th}$ CSI-RS port is sent by using all antenna elements in a same polarization direction (for example, a +45° polarization antenna), and a CSI-RS of a $(N_v*N_h)^{th}$ CSI-RS port to a $(2*N_v*N_h-1)^{th}$ CSI-RS port is sent by using antenna elements in another polarization direction (for example, a −45° polarization antenna). It may be understood that, alternatively, a relationship between the CSI-RS port and the antenna element may be another situation other than the situation described herein.

Before a CSI-RS is sent by using an $m^{th}$ (m is greater than or equal to 0, and is less than $2*N_v*V_h-1$) CSI pilot (another name of an RS) port, a CSI-RS symbol is multiplied by a Kronecher product $$X_h^{m\,mod\,N_h} \otimes X_v^{\lceil \frac{m}{N_v} \rceil}$$

that is obtained by multiplying a mod $N_h^{th}$ column $X_h^{m\,mod\,N_h}$ of a diagonal matrix $X_h$ in a precoding matrix $W_{1h}$ by a $$\lceil \frac{m}{N_v} \rceil^{th}$$

column $$X_v^{\lceil \frac{m}{N_v} \rceil}$$

of a diagonal matrix $X_v$ in a precoding matrix $W_{1v}$. mod indicates a modulo operation, $\lceil\ \rceil$ indicates rounding up, and obtaining a Kronecher product is a matrix multiplication operation in the prior art.

As described above, a quantity of ports of the third CSI-RS may be less than $2*N_v*V_h$, and in this case:

(3a.1) When configuring the third CSI-RS, the base station may use a bit sequence $b_0 b_1 b_2 \ldots b_{N_v*N_h-1}$ to indicate a relationship between a port and a precoding matrix. An $m^{th}$ bit is 1 (that is, $b_m=1$), and it indicates that a CSI-RS precoded by using $$X_h^{m\,mod\,N_h} \otimes X_v^{\lceil \frac{m}{N_v} \rceil}$$

exists, and the CSI-RS is corresponding to a $$\sum_{n=0}^{m} b_n^{th}$$

(a same polarization direction) CSI-RS port and a $$\sum_{n=0}^{m} b_n + \sum_{n=0}^{Nv*N_h-1} b_n^{th}$$

(another polarization direction) CSI-RS port. In an example, four bits in total are 1, that is, the third CSI-RS needs eight antenna ports (four antenna ports for each polarization direction). As shown in FIG. 7a, precoding in a same polarization direction is separately performed for an antenna port 15 to an antenna port 18 of an eight-antenna port CSI-RS before transmission is performed, and precoding in another polarization direction is separately performed for an antenna port 19 to an antenna port 22 before transmission is performed.

Figure 7B:
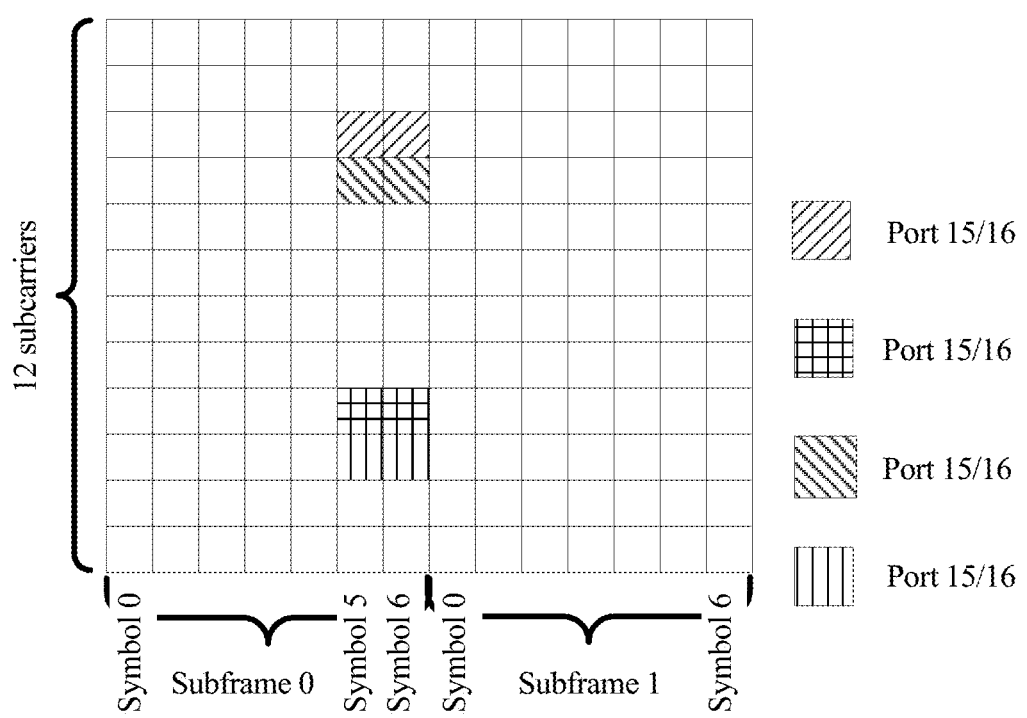

(3a.2) The base station configures an enhanced third CSI-RS for the UE. The third CSI-RS may include a plurality of CSI-RS resources, and a quantity of ports of each CSI-RS resource is a quantity of ports supported by existing LTE. For example, each CSI-RS resource includes two, four, or eight CSI-RS ports, and each CSI-RS resource occupies different physical time-frequency resources. When the base station transmits the third CSI-RS, narrow beams are used to correspond to different ports of different CSI-RS resources. As shown in FIG. 7b, it is assumed that the third CSI-RS is sent through eight narrow beams (four narrow beams in each polarization direction, it is assumed that narrow beams in a polarization direction are numbered from a beam 0 to a beam 3, and narrow beams in another polarization direction are numbered from a beam 4-a beam 7), and occupies eight orthogonal pilot resources in total. According to this solution, the third CSI-RS may include four two-antenna-port CSI-RS resources, which are denoted as a CSI-RS resource 1 to a CSI-RS resource 4. When the base station performs transmission by using the CSI-RS resource 1, a CSI-RS corresponding to a port 15 needs to be sent after being precoded by using the beam 0, and a CSI-RS corresponding to a port 16 needs to be sent after being precoded by using the beam 4. When the base station performs transmission by using a CSI-RS resource 2, a CSI-RS corresponding to a port 15 needs to be sent after being precoded by using a beam 1, and a CSI-RS corresponding to a port 16 needs to be sent after being precoded by using a beam 5. When the base station performs transmission by using a CSI-RS resource 3, a CSI-RS corresponding to a port 15 needs to be sent after being precoded by using a beam 2, and a CSI-RS corresponding to a port 16 needs to be sent after being precoded by using a beam 6. When the base station performs transmission by using the CSI-RS resource 4, a CSI-RS corresponding to a port 15 needs to be sent after being precoded by using the beam 3, and a CSI-RS corresponding to a port 16 needs to be sent after being precoded by using the beam 7.

The description is merely an example. Specifically, a quantity of CSI-RS resources and configuration of each CSI-RS resource (including a quantity of ports, an occupied time-frequency resource, and the like) may be dynamically determined by the base station.

(3b) For a situation in which $W_{1h}$ and $W_{1v}$ use the foregoing feedback manner (2b) for feedback, that is, a situation in which $$W_1 = \begin{bmatrix} X_1 & 0 \\ 0 & X_2 \end{bmatrix}$$

Optionally, the following example is used herein for description: a CSI-RS of a zeroth CSI-RS port to a $(N_v * N_h - 1)^{th}$ CSI-RS port is sent by using all antenna elements in a same polarization direction (for example, a +45° polarization antenna), and a CSI-RS of a $(N_v * N_h)^{th}$ CSI-RS port to a $(2*N_v*N_h-1)^{th}$ CSI-RS port is sent by using antenna elements in another polarization direction (for example, a −45° polarization antenna). It may be understood that, alternatively, a relationship between the CSI-RS port and the antenna element may be another situation other than the situation described herein.

A CSI-RS of an $m^{th}$ (m is greater than or equal to 0, and is less than $N_{h1}*N_{v1}-1$) CSI-RS port is sent by using all antennas in a same polarization direction (for example, a left polarization antenna). Before being sent, a pilot symbol is multiplied by a Kronecher product $$X_{1,h}^{m \bmod N_{h1}} \otimes X_{1,v}^{\left\lceil \frac{m}{N_{v1}} \right\rceil}$$

that is obtained by multiplying m mod $N_{h1}^{th}$ column $X_{1,h}^{m \bmod N_{h1}}$ of an upper left diagonal matrix $X_{1,h}$ in the precoding matrix $W_{1h}$ by a $$\left\lceil \frac{m}{N_{v1}} \right\rceil^{th}$$

column $$X_{1,v}^{\left\lceil \frac{m}{N_{v1}} \right\rceil}$$

of an upper left diagonal matrix $X_{1,v}$ in the precoding matrix $W_{1v}$. A CSI-RS of an $m^{th}$ (m is greater than or equal to $N_{h1}*N_{v1}$, and is less than $2*N_{h1}*N_{v1}-1$) CSI-RS port is sent by using antennas in another polarization direction (for example, a right polarization antenna). Before being sent, the pilot symbol is multiplied by a Kronecher product $$X_{2,h}^{r \bmod N_h} \otimes X_{2,v}^{\left\lceil \frac{r}{N_v} \right\rceil}$$

that is obtained by multiplying a r mod $N_{h2}^{th}$ column $X_{2,h2}^{r \bmod N_{h2}}$ of a lower right diagonal matrix $X_{2,h}$ in the precoding matrix $W_{1h}$ by a $$\left\lceil \frac{r}{N_v} \right\rceil^{th}$$

column $$X_{2,v}^{\left\lceil \frac{r}{N_v} \right\rceil}$$

of a lower right diagonal matrix $X_{2,h}$ in the precoding matrix $W_{1v}$, where $r=m-N_{h1}*N_{v1}$. (that is, a CSI-RS of a CSI-RS port is multiplied by a diagonal matrix corresponding to a polarization direction of an antenna element that is used to send the CSI-RS).

Optionally, a quantity of ports of the third CSI-RS may be less than $N_{v1}*V_{h1}+N_{v2}*V_{h2}$. In this case, when configuring the third CSI-RS, the base station may use a bit sequence $b_0 b_1 b_2 \ldots b_{N_{V1}*N_{h1}+N_{v2}*N_{h2-1}}$ to indicate a relationship between a port and a precoding matrix. An $n^{th}$ bit is 1, and if n is less than $N_{h1}*N_{v1}$, it indicates that a CSI-RS precoded by using $$X_{1,h}^{n \bmod N_{h1}} \otimes X_{1,v}^{\left\lceil \frac{n}{N_{v1}} \right\rceil}$$

exists, and the CSI-RS is corresponding to a $$\sum_{n=0}^{m} b_n^{th}$$

(a same polarization direction) CSI-RS port. If n is greater than or equal to $N_{h1}*N_{v1}$, it indicates that a CSI-RS precoded by using $$X_{2,h}^{r \bmod N_{h2}} \otimes X_{2,v}^{\left\lceil \frac{r}{N_{v2}} \right\rceil}$$

exists, and the CSI-RS is corresponding to a $$\sum_{n=0}^{M} b_n^{th}$$

(a same polarization direction) CSI-RS port, where $r=m-N_{h1}*N_{v1}$.

S6. The UE receives the third CSI-RS, and performs CSI measurement for the third CSI-RS configured in S5. Because the third CSI-RS may be configured in different manners, alternatively, CSI information fed back by the UE is different. A specific form may be determined according to a standard or an actual system design.

Optionally, the third CSI measurement result includes a third precoding matrix indicator (PMI).

Optionally, the third CSI measurement result is corresponding to a narrow beam codebook, and the narrow beam codebook is used to represent selection of a narrow beam in a corresponding wide beam in a wide beam codebook and selection of a co-phasing factor between antenna elements corresponding to the wide beam.

Specifically, the third CSI measurement result may include one of (4a) and (4b). A specific form may be determined according to a standard or an actual system design.

(4a) is for the foregoing situation (3a.1) or (3b).

The UE feeds back a second precoding matrix ($W_2$) jointly formed by the selected narrow beam and a quantized co-phasing coefficient between different polarization antennas. A specific feedback form may be the same as a feedback form of an index corresponding to the second precoding matrix in the existing LTE protocol. Further, the UE further feeds back RI and a CQI, so that the base station obtains a combined precoding matrix required for data transmission. Selecting the narrow beam is performing column selection on the first codebook, and the quantized co-phasing coefficient between different polarization antennas is a quantized phase difference between two antennas in different polarization directions (each antenna in a same polarization direction may include one antenna element, or may include a plurality of antenna elements).

Optionally, the narrow beam codebook is a second precoding matrix $W_2$, and $$W_2 \in C_2 = \left\{ \frac{1}{\sqrt{2}} \begin{bmatrix} Y_1 \\ \Psi Y_2 \end{bmatrix} \right\},$$

where $Y_1$ and $Y_2$ each include a selection vector, $Y_1$ is used to represent selection of a narrow beam set in a corresponding wide beam in a wide beam codebook and in a polarization direction, $Y_2$ is used to represent selection of a narrow beam set in a corresponding wide beam in a wide beam codebook and in another polarization direction, $\Psi$ is a diagonal matrix including a co-phasing factor between antenna elements, and each element on a diagonal line is used to represent a phase difference between antenna elements in different polarization directions corresponding to a same column of $Y_2$ and $Y_1$.

Optionally, the second precoding matrix may be one of two forms: (4a.1) and (4a.2). A specific form may be determined according to a standard or an actual system design. Specifically:

(4a.1) Similar to the existing LTE, it is mainly for a case in which the first codebook is (2a), and when performing third CSI-RS transmission, the BS uses the precoding in (3a.1) to beamform and send the CSI-RS. Constitution of the second precoding matrix includes selecting a same beam in all polarization directions, and adding a quantized co-phasing coefficient between different polarization antennas.

(4a.2) Different from the existing LTE, it is mainly for a case in which the first codebook is (2b), and when performing the third CSI-RS transmission, the BS uses the precoding in (3b) to beamform and send the CSI-RS. Constitution of the second precoding matrix includes selecting different beams in all polarization directions, and adding a quantized co-phasing coefficient between different polarization antennas. That is, in the foregoing second precoding matrix of the LTE, Y can be independently selected, that is, $Y_1$ is not equal to $Y_2$.

(4b) is for the foregoing situation (3a.2).

The UE feeds back an ID corresponding to one CSI-RS resource in a plurality of CSI-RS resources configured for the third CSI-RS and the second precoding matrix including one or more narrow beam IDs in the selected CSI-RS resource and the quantized co-phasing coefficient between different polarization antennas. A specific feedback form may be the same as or similar to a feedback form of the second codebook in the existing LTE protocol. Further, the UE may feed back RI and a CQI, so that the base station obtains a combined precoding matrix required for data transmission.

It may be understood that when the third CSI-RS is configured with only one CSI-RS resource, the second precoding matrix is the same as that in (4a). A difference between this solution and (4a) lies in feedback of a selected CSI-RS resource.

It may be understood that because a main function of the first CSI-RS and the second CSI-RS is to obtain the wide beam codebook $W_1$, a measurement initiation period (including transmission by a base station and feeding back by UE) of the first CSI-RS and the second CSI-RS may be greater than a measurement initiation period that is of the third CSI-RS and that is used to obtain a short-time codebook, that is, a plurality of measurements of the third CSI-RS may exist between two first CSI-RS measurement initiations or two second CSI-RS measurement initiations.

By means of combining a wideband CSI-RS (the first CSI-RS and the second CSI-RS) and a narrowband CSI-RS (the third CSI-RS) provided in this embodiment of the present invention, in a scenario in which there are a plurality of antenna ports, calculation complexity on a UE side may be reduced, and a feedback amount on the UE side may be reduced, thereby reducing a resource occupied by an uplink control channel and increasing a data throughput of an uplink user.

Figure 8:
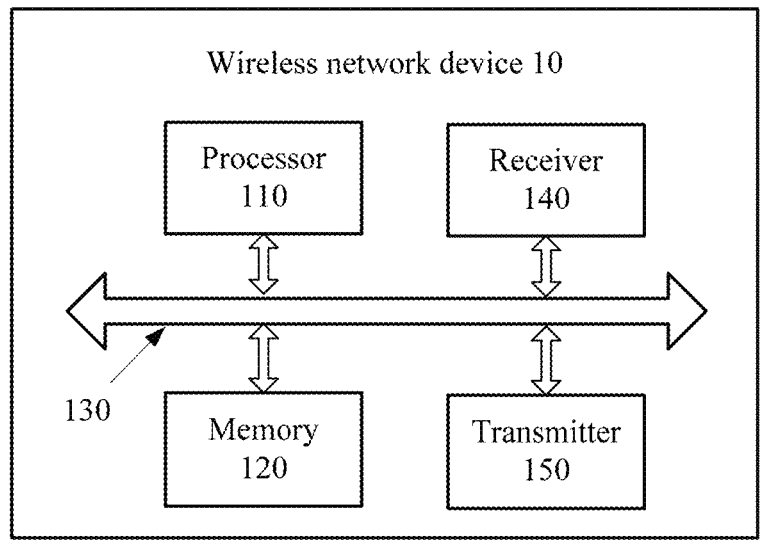
FIG. 8 is a schematic diagram of a multi-antenna channel measurement apparatus according to an embodiment of the present invention.

According to the foregoing method, as shown in FIG. 8, an embodiment of the present invention further provides an apparatus for multi-antenna channel measurement. The apparatus may be a wireless network device 10. The wireless network device 10 is corresponding to the first wireless network device in the foregoing method. The first wireless network device may be a base station, or may be another device. This is not limited herein.

The wireless network device includes a processor 110, a memory 120, a bus system 130, a receiver 140, and a transmitter 150. The processor 110, the memory 120, the receiver 140, and the transmitter 150 are connected to each other by using the bus system 130. The memory 120 is configured to store an instruction. The processor 110 is configured to execute the instruction stored in the memory 120 to control the receiver 140 to receive a signal and control the transmitter 150 to send a signal, so as to complete steps of the first wireless network device (for example, a base station) in the foregoing method. The receiver 140 and the transmitter 150 may be a same physical entity or different physical entities. When the receiver 140 and the transmitter 150 are the same physical entity, the receiver 140 and the transmitter 150 may be collectively referred to as a transceiver.

In an implementation, functions of the receiver 140 and the transmitter 150 may be considered to be implemented by using a transceiver circuit or a dedicated transceiver chip. The processor 110 may be considered to be implemented by using a specialized processing chip, processing circuit, processor or a universal chip.

In another implementation, it may be considered to implement a wireless access device provided in this embodiment of the present invention in a manner of a general-purpose computer. That is, program code that is used to implement functions of the processor 110, the receiver 140, and the transmitter 150 is stored in the memory. A general-purpose processor implements the functions of the processor 110, the receiver 140, and the transmitter 150 by executing the code in the memory.

For concepts, explanation, detailed description, and other steps that are related to the technical solution provided in this embodiment of the present invention and that are used in the wireless network device, refer to the foregoing method or description about the content in another embodiment. Details are not described herein.

Figure 9:
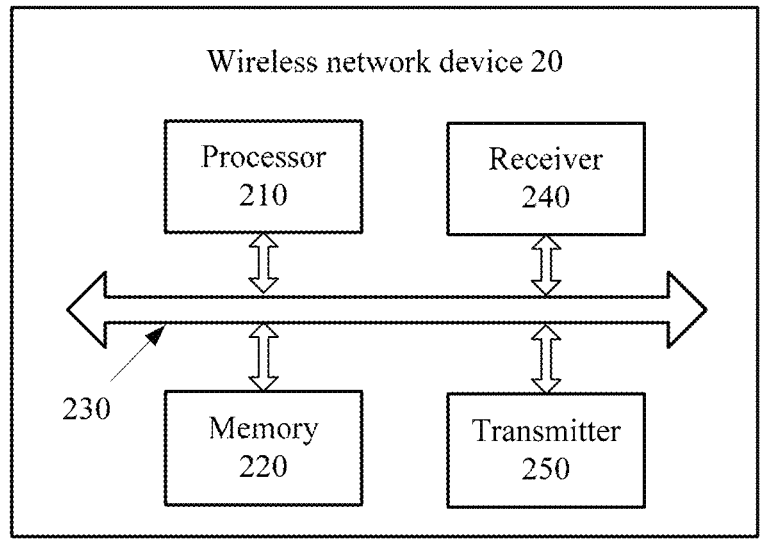
FIG. 9 is a schematic diagram of another multi-antenna channel measurement apparatus according to an embodiment of the present invention.

According to the foregoing method, as shown in FIG. 9, an embodiment of the present invention further provides another apparatus for multi-antenna channel measurement. The apparatus may be a wireless network device 20. The wireless network device 20 is corresponding to the second wireless network device in the foregoing method. The second wireless network device may be UE, or may be a micro base station or a small-cell base station. This is not limited herein.

The wireless network device includes a processor 210, a memory 220, a bus system 230, a receiver 240, and a transmitter 250. The processor 210, the memory 220, the receiver 240, and the transmitter 250 are connected to each other by using the bus system 230. The memory 220 is configured to store an instruction. The processor 210 is configured to execute the instruction stored in the memory 220 to control the receiver 240 to receive a signal and control the transmitter 250 to send a signal, so as to complete steps of the second wireless network device (for example, UE) in the foregoing method. The receiver 240 and the transmitter 250 may be a same physical entity or different physical entities. When the receiver 240 and the transmitter 250 are the same physical entity, the receiver 240 and the transmitter 250 may be collectively referred to as a transceiver.

In an implementation, functions of the receiver 240 and the transmitter 250 may be considered to be implemented by using a transceiver circuit or a dedicated transceiver chip. The processor 210 may be considered to be implemented by using a specialized processing chip, processing circuit, processor or a universal chip.

In another implementation, it may be considered to implement a wireless access device provided in this embodiment of the present invention in a manner of a general-purpose computer. That is, program code that is used to implement functions of the processor 210, the receiver 240, and the transmitter 250 is stored in the memory. A general-purpose processor implements the functions of the processor 210, the receiver 240, and the transmitter 250 by executing the code in the memory.

For concepts, explanation, detailed description, and other steps that are related to the technical solution provided in this embodiment of the present invention and that are used in the second wireless network device, refer to the foregoing method or description about the content in another embodiment. Details are not described herein.

According to the methods provided in the embodiments of the present invention, an embodiment of the present invention further provides a communications system. The communications system includes the foregoing first wireless network device and one or more second wireless network devices.

It should be understood that, in the embodiment of the present invention, the processor 110 or 210 may be a central processing unit (Central Processing Unit, "CPU" for short). Alternatively, the processor may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor, or the like.

The memory 120 or 220 may include a read-only memory and a random access memory, and provides an instruction and data for the processor 310. A part of the memory may further include a nonvolatile random access memory. For example, the memory may further store information about a device type.

In addition to a data bus, the bus system 130 or 230 may further include a power bus, a control bus, a status signal bus, and the like. However, for clarity of description, various buses are marked as the bus system in the figure.

In an implementation process, the steps in the foregoing methods may be completed by using an integrated logic circuit of hardware in the processor 110 or 210 or an instruction in a form of software. The steps of the method disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method in combination with the hardware in the processor. To avoid repetition, details are not described herein.

It should further be understood that a first, a second, a third, a fourth, and various numerical symbols in this specification are merely distinguished for ease of description, and are not used to limit a scope of the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
    receiving, by a terminal, a first channel state information-reference signal (CSI-RS) and a second CSI-RS sent by a wireless network device, and performing CSI measurement based on the first CSI-RS and the second CSI-RS, wherein the first CSI-RS and the second CSI-RS are sent in different time intervals through antenna elements in orthogonal dimensions;
    feeding back, by the terminal, a first CSI measurement result for the first CSI-RS and the second CSI-RS to the wireless network device;
    receiving, by the terminal, a third CSI-RS, wherein the third CSI-RS has been precoded according to the first CSI measurement result; and
    feeding back, by the terminal, a second CSI measurement result for the third CSI-RS to the wireless network device.

2. The method according to claim 1, wherein the first CSI-RS and the second CSI-RS are configured by using radio resource control (RRC) signaling, and configurations of the first CSI-RS and the second CSI-RS by the RRC signaling are included in different CSI processes, or are in a same enhanced CSI process.

3. The method according to claim 1, wherein configurations of the first CSI-RS and/or the second CSI-RS comprise:
    a first indication, notifying the terminal that a currently sent CSI-RS is the first CSI-RS and/or the second CSI-RS; and/or
    a second indication, indicating that the first CSI-RS and/or the second CSI-RS are/is sent by using antenna elements in a same polarization direction, or the first CSI-RS and/or the second CSI-RS are/is sent through antenna elements in two polarization directions.

4. The method according to claim 1, wherein the third CSI-RS is configured by using radio resource control (RRC) signaling, and a configuration of the third CSI-RS by the RRC signaling comprises a third indication to notify the terminal that a currently sent CSI-RS is the third CSI-RS.

5. The method according to claim 1, wherein the third CSI-RS is configured by using radio resource control (RRC) signaling, and a configuration of the third CSI-RS by the RRC signaling comprises simultaneous configuration of a plurality of CSI-RS resources.

6. The method according to claim 1, wherein the first CSI measurement result comprises a first precoding matrix indicator (PMI) corresponding to a first codebook.

7. The method according to claim 6, wherein the first PMI comprises a PMI 1 fed back for the first CSI-RS and a PMI 2 fed back for the second CSI-RS, and both the PMI 1 and the PMI 2 are corresponding to the first codebook.

8. The method according to claim 6, wherein the first codebook is a diagonal matrix (W1) comprising two sub-matrices, and the two sub-matrices are respectively corresponding to two polarization directions of antenna elements; and each column of each sub-matrix is a column selected from a matrix $\overline{X}$, the column of each sub-matrix selected from the matrix $\overline{X}$ forms a wide beam in a same polarization direction of the antenna elements, an element in an $i^{th}$ row and a $j^{th}$ column of the matrix $\overline{X}$ is $$\overline{X_{i,j}} = e^{j\frac{2\pi(i-1)(j-1)}{K}},$$

$i \in \{1, 2, \ldots, I\}$, $j \in \{1, 2, \ldots, K\}$, wherein if the first CSI measurement result is fed back for the first CSI-RS, I is a value indicating half of a quantity of ports for the first CSI-RS, or if the first CSI measurement result is fed back for the second CSI-RS, I is a value indicating half of a quantity of ports for the second CSI-RS, and K is a quantity of narrow beams supported by a system.

9. The method according to claim 6, wherein the first codebook is a matrix corresponding to a same polarization direction of the antenna elements, each column of the matrix is a column selected from a matrix $\overline{X}$, a column of each sub-matrix selected from the matrix $\overline{X}$ forms a wide beam in a same polarization direction of the antenna elements, an element in an $i^{th}$ row and a $j^{th}$ column of the matrix $\overline{X}$ is $$\overline{X_{i,j}} = e^{j\frac{2\pi(i-1)(j-1)}{K}},$$

$i \in \{1, 2, \ldots, I\}$, $j \in \{1, 2, \ldots, K\}$, wherein if the first CSI measurement result is fed back for the first CSI-RS, I is a quantity of ports for the first CSI-RS, or if the first CSI measurement result is fed back for the second CSI-RS, I is a quantity of ports for the second CSI-RS, and K is a quantity of narrow beams supported by a system.

10. The method according to claim 1, wherein the third CSI measurement result comprises a third precoding matrix indicator (PMI) that is corresponding to a second codebook.

11. The method according to claim 10, wherein the third CSI measurement result further comprises an identifier of a selected CSI-RS resource.

12. The method according to claim 1, wherein a second codebook is a matrix $W_2$, and $$W_2 \in C_2 = \left\{ \frac{1}{\sqrt{2}} \begin{bmatrix} Y_1 \\ \Psi Y_2 \end{bmatrix} \right\},$$

wherein $Y_1$ and $Y_2$ each comprise a selection vector, $Y_1$ represents a corresponding column vector selection in a first codebook and in a polarization direction, $Y_2$ represents a corresponding column vector selection in the first codebook and in another polarization direction, $\Psi$ is a diagonal matrix comprising a co-phasing factor between antenna elements, and each element on a diagonal line represents a phase factor between column vectors corresponding to a same column of $Y_2$ and $Y_1$.

13. A terminal, comprising a processor, a memory, and a transceiver, wherein:

the memory is configured to store an instruction, the processor is configured to execute the instruction stored in the memory, to control the transceiver to receive and send signals; and when the processor executes the instruction stored in the memory, a wireless network device is configured to:

receive a first channel state information-reference signal (CSI-RS) and a second CSI-RS sent by a wireless network device, and performing CSI measurement based on the first CSI-RS and the second CSI-RS, wherein the first CSI-RS and the second CSI-RS are sent in different time intervals through antenna elements in orthogonal dimensions;

feed back a first CSI measurement result for the first CSI-RS and the second CSI-RS to the wireless network device;

receive a third CSI-RS, wherein the third CSI-RS has been precoded according to the first CSI measurement result; and feed back a second CSI measurement result for the third CSI-RS to the wireless network device.

14. The terminal according to claim 13, wherein the first CSI-RS and the second CSI-RS are configured by using radio resource control (RRC) signaling, and configurations of the first CSI-RS and the second CSI-RS are included in different CSI processes, or are in a same enhanced CSI process.

15. The terminal according to claim 13, wherein configurations of the first CSI-RS and/or the second CSI-RS comprise:

a first indication, used to notify the terminal that a currently sent CSI-RS is the first CSI-RS and/or the second CSI-RS; and/or a second indication, used to indicate that the first CSI-RS and/or the second CSI-RS are/is sent by using antenna elements in a same polarization direction, or the first CSI-RS and/or the second CSI-RS are/is sent by using antenna elements in two polarization directions.

16. The terminal according to claim 13, wherein the third CSI-RS is configured by using radio resource control (RRC) signaling, and the configuration of the third CSI-RS by the RRC signaling comprises a third indication to notify the terminal that a currently sent CSI-RS is the third CSI-RS.

17. The terminal according to claim 13, wherein the third CSI-RS is configured by using radio resource control (RRC) signaling, and the configuration of the third CSI-RS by the RRC signaling comprises simultaneous configuration of a plurality of CSI-RS resources.

18. The terminal according to claim 13, wherein the first CSI measurement result comprises a first precoding matrix indicator (PMI) corresponding to a first codebook.

19. The terminal according to claim 18, wherein the first PMI comprises a PMI 1 fed back for the first CSI-RS and a PMI 2 fed back for the second CSI-RS, and both the PMI 1 and the PMI 2 corresponding to the first codebook.

20. The terminal according to claim 18, wherein the first codebook is a diagonal matrix ($W_1$) comprising two sub-matrices, and the two sub-matrices are respectively corresponding to two polarization directions of antenna elements; and each column of each sub-matrix is a column selected from a matrix, the column of each sub-matrix selected from the matrix forms a wide beam in a same polarization direction of the antenna elements, an element in an ith row and a jth column of the matrix is, wherein if the first CSI measurement result is fed back for the first CSI-RS, I is a half of a quantity of ports for the first CSI-RS, or if the first CSI measurement result is fed back for the second CSI-RS, I is a value indicating half of a quantity of ports for the second CSI-RS, and K is a quantity of narrow beams supported by a system.

* * * * *